(12) United States Patent
Lee et al.

(10) Patent No.: US 11,188,737 B2
(45) Date of Patent: Nov. 30, 2021

(54) SYSTEMS AND METHODS FOR CELL MEMBRANE IDENTIFICATION AND TRACKING, AND TECHNIQUE AUTOMATION USING THE SAME

(71) Applicant: Georgia Tech Research Corporation, Atlanta, GA (US)

(72) Inventors: John Lee, Atlanta, GA (US); Christopher John Rozell, Atlanta, GA (US)

(73) Assignee: Georgia Tech Research Corporaton, Atlanta, GA (US)

( * ) Notice: Subject to any disclaimer, the term of this patent is extended or adjusted under 35 U.S.C. 154(b) by 16 days.

(21) Appl. No.: 15/931,684

(22) Filed: May 14, 2020

(65) Prior Publication Data

US 2020/0279092 A1    Sep. 3, 2020

Related U.S. Application Data

(63) Continuation of application No. 16/116,192, filed on Aug. 29, 2018, now Pat. No. 10,733,419.
(Continued)

(51) Int. Cl.
*G06K 9/00* (2006.01)
*G06K 9/40* (2006.01)
(Continued)

(52) U.S. Cl.
CPC ............. *G06K 9/0014* (2013.01); *G06K 9/40* (2013.01); *G06T 5/003* (2013.01); *G06T 7/12* (2017.01);
(Continued)

(58) Field of Classification Search
CPC ........ G06K 9/0014; G06K 9/40; G06T 7/136; G06T 7/12; G06T 7/277; G06T 7/13; G06T 7/174; G06T 7/248; G06T 5/003; G06T 5/005; G06T 5/50; G06T 2207/10016; G06T 2207/10056; G06T 2207/20192; G06T 2207/30024
See application file for complete search history.

(56) References Cited

U.S. PATENT DOCUMENTS 7,498,551 B2    3/2009   Werner et al.
8,293,524 B2   10/2012   Ionescu-Zanetti et al.
(Continued)

FOREIGN PATENT DOCUMENTS

WO    2006047502    5/2006
WO    2006055413    5/2006

*Primary Examiner* — Atiba O Fitzpatrick
(74) *Attorney, Agent, or Firm* — Troutman Pepper Hamilton Sanders LLP; Ryan A. Schneider

(57) ABSTRACT

A system including a processor, and memory having stored thereon instructions that, when executed by the processor, control the processor to receive image data of a sequence of images, and a current image of the sequence of images being after a previous image in the sequence of images, each of the current and previous images including a cell, filter the current image to remove noise, iteratively deconvolve the filtered current image to identify edges of the cell within the current image based on determined edges of the cell within the previous image, and segment the deconvolved current image to determine edges of the cell within the current image.

20 Claims, 32 Drawing Sheets
(21 of 32 Drawing Sheet(s) Filed in Color)

Related U.S. Application Data

(60) Provisional application No. 62/551,570, filed on Aug. 29, 2017.

(51) Int. Cl.
*G06T 7/12* (2017.01)
*G06T 7/13* (2017.01)
*G06T 7/246* (2017.01)
*G06T 7/174* (2017.01)
*G06T 7/136* (2017.01)
*G06T 5/00* (2006.01)
*G06T 7/277* (2017.01)
*G06T 5/50* (2006.01)

(52) U.S. Cl.
CPC ............... *G06T 7/13* (2017.01); *G06T 7/136* (2017.01); *G06T 7/174* (2017.01); *G06T 7/248* (2017.01); *G06T 7/277* (2017.01); *G06T 5/005* (2013.01); *G06T 5/50* (2013.01); *G06T 2207/10016* (2013.01); *G06T 2207/10056* (2013.01); *G06T 2207/20192* (2013.01); *G06T 2207/30024* (2013.01)

(56) References Cited

U.S. PATENT DOCUMENTS

| | | | |
|---|---|---|---|
| 8,411,282 | B2 | 4/2013 | Cui et al. |
| 8,660,312 | B2 | 2/2014 | Cui et al. |
| 9,668,804 | B2 | 6/2017 | Kodandaramaiah et al. |
| 9,810,894 | B2 | 11/2017 | Grier et al. |
| 9,881,373 | B2 | 1/2018 | Murakami |
| 10,324,080 | B2 | 6/2019 | Chubykin et al. |
| 2010/0142778 | A1* | 6/2010 | Zhuo .................... G06T 5/50 382/128 |
| 2016/0266366 | A1* | 9/2016 | Chung ................ G02B 21/008 |
| 2018/0172578 | A1 | 6/2018 | Fiolka |

* cited by examiner

— · — $l_a$ : A pipette path, starting from ground truth centroid and extending though $p_a$
▫ $p_a$ : A pixel from the ground truth contour
◯ $p_{a,B}$ : Point on the estimated contour that the algorithm thinks the membrane lies
— — — Line segment representing the $\|p_{a,B} - p_a\|_2$ boundary error

SYSTEMS AND METHODS FOR CELL MEMBRANE IDENTIFICATION AND TRACKING, AND TECHNIQUE AUTOMATION USING THE SAME

CROSS-REFERENCE TO RELATED APPLICATIONS

This application is a continuation of U.S. application Ser. No. 16/116,192 filed 29 Aug. 2018, which claims the benefit of U.S. Provisional Patent Application No. 62/551,570 filed 29 Aug. 2017, the entire contents and substance of which are hereby incorporated by reference as if fully set forth below.

STATEMENT REGARDING FEDERALLY SPONSORED RESEARCH OR DEVELOPMENT

This invention was made with government support under Grant No. 1409422 awarded by the National Science Foundation. The government has certain rights in the disclosure.

THE NAMES OF THE PARTIES TO A JOINT RESEARCH AGREEMENT

Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Disclosure

Embodiments of the present disclosure generally relate to systems and methods for cell membrane identification and tracking and, in particular, cell membrane identification and tracking through using re-weighted total variation dynamic filtering.

2. Background

Live cell imaging allows the monitoring of complex biophysical phenomena as they happen in real time, which is beneficial in studying biological functions, observing drug action, or monitoring disease progression. For these experiments, tissue from an organ such as brain, heart, or liver is sliced and imaged while it is still alive. Fluorescence microscopy is often used for live cell imaging, but is not always practical because it requires the use of dyes or genetic engineering techniques to introduce fluorophores into the sample. Instead, it is often desirable to image unlabeled, otherwise optically transparent samples. This is often done using a phase contrast-enhancing technique such as differential interference contrast (DIC) microscopy.

DIC microscopy is widely used for observing unstained biological samples that are otherwise optically transparent. Using machine vision to automatically segment individual cells under DIC optics in real time would be highly useful for microscopy automation of life science experiments. However, precise cell segmentation is challenging, and the related art algorithms are not directly applicable to segmentation under DIC in tissue. Further, identifying relevant features under DIC is challenging. For instance, related art solutions fail to recognize cell-membrane boundaries with sufficient fidelity. Accordingly, certain laboratory techniques have not been able to be efficiently automated.

For example, patch clamping is an important experimental technique of taking high-fidelity electrophysiological measurements from single cells; not only is it considered the "gold" standard for recordings of electrical potentials, it also allows for intercellular access (i.e., extracting or inserting chemical and biological material from it). One method of patch clamping requires a micropipette to be positioned adjacent to a cell's membrane, for a tight seal to be formed using suction between its tip and the cell's membrane. The sheer laboriousness of such manual patch clamping makes automating this process highly advantageous.

Whole-cell patch clamp electrophysiology of neurons in vivo enables the recording of electrical events in cells with great precision and supports a wide diversity of morphological and molecular analysis experiments important for the understanding of single-cell and network functions in the intact brain. In a typical whole-cell patch clamp electrophysiology implementation, a glass pipette electrode is used to gain electrical and molecular access to the inside of a cell. This permits high-fidelity recording of electrical activity in neurons embedded within intact tissue, such as in brain slices, or in vivo. Whole-cell patch clamp recordings of the electrical activity of neurons in vivo, which utilize the glass micropipettes to establish electrical and molecular access to the insides of neurons embedded in intact tissue, exhibit signal quality and temporal fidelity sufficient to report synaptic and ion-channel mediated subthreshold events of importance for understanding how neurons compute, and how their physiology can be modulated by brain disorders or pharmaceuticals. Whole-cell patch clamping of cells in intact tissue also allows for infusion of chemicals and extraction of cell contents. Molecular access to the cell enables infusion of dyes for morphological visualization, as well as extraction of cell contents for transcriptomic single-cell analysis, thus enabling integrative analysis of molecular, anatomical, and electrophysiological information about single neurons in intact tissue. Generally, the patch clamping process is extremely delicate, and the micropipette must be placed just at the cell's boundary, and within tolerances of the robotic actuator (1-2 μm).

It is typical for in vitro brain slice electrophysiology to use DIC microscopy since it is an intrinsic contrast microscopy that does not cause photo-bleaching and phototoxicity, in contrast to exogenous contrast methods like fluorescence microscopy. Cell segmentation on DIC microscopy is especially difficult due to the presence of DIC optical artifacts. Prior work in the DIC cell segmentation literature were found unsuitable in meeting the needs of this particular application. For example, traditional image processing methods for segmentation were applicable only on imagery with extremely low noise. The more sophisticated method of deconvolution was sought since it was able to handle high-noise applications. Other promising and recent variants of DIC deconvolution algorithms exploited structures of smoothness, sparsity, and dynamics for non-linear deconvolution, but they too were not capable of handling the heavy organic interference experienced in this data.

Related-art general purpose segmentation algorithms in the computer vision literature typically assume statistical homogeneity within (or outside) a segmentation region that is lost under contrast-enhancing optical approaches such as DIC. Certain related-art cell segmentation and tracking methods are also not directly applicable to cell segmentation under DIC in tissue. For example, some algorithms are developed on the CTC dataset that includes only of microscopy imagery of cultured cells (rather than tissue slices) that had minimal organic tissue interference (FIG. 1). These cell-tracking methods (1) often assume simple noise statistics, (2) target gross cell location tracking for mechanobiology tasks (e.g., studies on cell migration, morphology) rather than precise membrane localization, and (3) are designed to be run offline rather than in real time.

Recent work on patch clamping has had some success in using a robotic actuator to maneuver the pipette to form the seal (see, e.g., U.S. Pat. No. 9,668,804, US Patent Publication Nos. 2018/0028081, and US 2017/0138926, the disclosures of which are incorporated herein by reference in their entireties). While the related art has demonstrated the possibility of automating the patch clamp process by using a motorized robotic actuator to maneuver the probe to the target cell, such work has been limited by the related-art methods that do not sufficiently identify and track cell boundaries in real time. For example, several challenges that make cell membrane localization very difficult (e.g., (1) heavy interference from the presence of organic tissue around the target cell, (2) low signal-to-noise ratio (SNR) due to scattering of light characteristic of thick tissue samples, and (3) cell motion induced by the glass probe) are not effectively overcome in the related art.

What is needed, therefore, is a method and system for identifying and tracking cell membranes in high-noise samples that are capable of precisely localizing the cell membranes and performing the localization in real time. It is to such a method and system that embodiments of the present disclosure are directed.

BRIEF SUMMARY OF THE DISCLOSURE

As described herein, there is a great need in the art to identify technologies for identifying and tracking cell membranes and use this understanding to develop novel systems and methods for localizing cell membranes with high precision in real time in samples with heavy organic interference. Certain aspects of the present disclosure satisfy this and other needs.

According to some embodiments there is provided a system including a processor, and memory having stored thereon instructions that, when executed by the processor, control the processor to receive image data of a sequence of images, and a current image of the sequence of images being after a previous image in the sequence of images, each of the current and previous images including a cell, filter the current image to remove noise, iteratively deconvolve the filtered current image to identify edges of the cell within the current image based on determined edges of the cell within the previous image, and segment the deconvolved current image to determine edges of the cell within the current image.

The instructions may further control the processor to identify, within the current image, a subset of the current image containing the cell, deconvolving being performed only the identified subset of the current image.

The instructions may control the processor to iteratively deconvolve the current image by determining an estimated edge that minimizes a cost function, adjusting weights of the cost function based on the estimated edge, and repeating the determining and adjusting.

The cost function may include a first time corresponding to a predictive error between the current image and an image predicted from the estimated edge, and a second term corresponding to a connectivity determination of the estimated edge within the current image.

The adjusted weights of the cost function may modify the connectivity determination of the estimated edge within the current image. The determined edges of the cell within the previous image may impact the adjusted weights.

The instructions may control the processor to iteratively deconvolve the current image by iteratively estimate an edge that minimizes a cost function utilizing alternating direction method of multipliers (ADMM), adjusting weights of the cost function based on the estimated edge, and repeating the determining and adjusting.

The instructions may further control the processor to output instructions to an articulating arm to position an instrument proximal to the determined edge of the current image. The instrument may include one or more of an electrode, an injector, and a manipulation instrument.

The instructions may further control the processor to set the current image as the previous image, set a next image in the sequence of images as the current image, and repeat the filtering, iteratively deconvolving, and segmenting.

The sequence of image comprises a live video, and the edges of the cell within the current image are determined in near real-time.

According to some embodiments there is provided a method including receiving image data of a sequence of images, and a current image of the sequence of images being after a previous image in the sequence of images, each of the current and previous images including a cell, filtering the current image to remove noise, iteratively deconvolving the filtered current image to identify edges of the cell within the current image based on determined edges of the cell within the previous image, and segmenting the deconvolved current image to determine edges of the cell within the current image.

The method may further include identifying, within the current image, a subset of the current image containing the cell, deconvolving being performed only the identified subset of the current image.

The method may include iteratively deconvolving the current image by determining an estimated edge that minimizes a cost function, adjusting weights of the cost function based on the estimated edge, and repeating the determining and adjusting.

The cost function may include a first time corresponding to a predictive error between the current image and an image predicted from the estimated edge, and a second term corresponding to a connectivity determination of the estimated edge within the current image.

The adjusted weights of the cost function may modify the connectivity determination of the estimated edge within the current image, and the determined edges of the cell within the previous image may impact the adjusted weights.

The method may include deconvolving the current image by iteratively estimate an edge that minimizes a cost function utilizing ADMM, adjusting weights of the cost function based on the estimated edge, and repeating the determining and adjusting.

The method may further include moving an articulating arm to position an instrument proximal to the determined edge of the current image.

The method may further include setting the current image as the previous image, setting a next image in the sequence of images as the current image, and repeating the filtering, iteratively deconvolving, and segmenting.

The sequence of image comprises a live video, and the edges of the cell within the current image are determined in near real-time.

According to some embodiments there is provided one or more non-transitory computer-readable media comprising instructions that when executed by one or more computing devices cause the one or more computing devices to receive from an imaging device image data representative of a temporal sequence of images of at least a portion of a cell, the temporal sequence of images including a current image and a previous image imaged before the current image, filtering at least a portion of the noise from the current image, iteratively deconvolving the filtered current image to identify an edge of the cell within the filtered current image based on a determined edge of the cell within the previous image, and segmenting the deconvolved filtered current image to determine the edge of the cell within the filtered current image.

These and other objects, features and advantages of the present disclosure will become more apparent upon reading the following specification in conjunction with the accompanying description, claims and drawings.

BRIEF DESCRIPTION OF THE DRAWINGS

The accompanying Figures, which are incorporated in and constitute a part of this specification, illustrate several aspects described below. The patent or application file contains at least one drawing executed in color. Copies of this patent or patent application publication with color drawing(s) will be provided by the Office upon request and payment of the necessary fee.

(FIG. 14A) the pipette is far from the cell, (FIG. 14B) the pipette is in close proximity to the cell, and (FIG. 14C) the pipette is "touching" the cell. The efficacy of the proposed inpainting method for pipette removal (versus no inpainting) is qualitatively demonstrated by its ability to cleanly segment the cell despite the pipette's presence.

DETAILED DESCRIPTION OF THE DISCLOSURE

Figure 1:
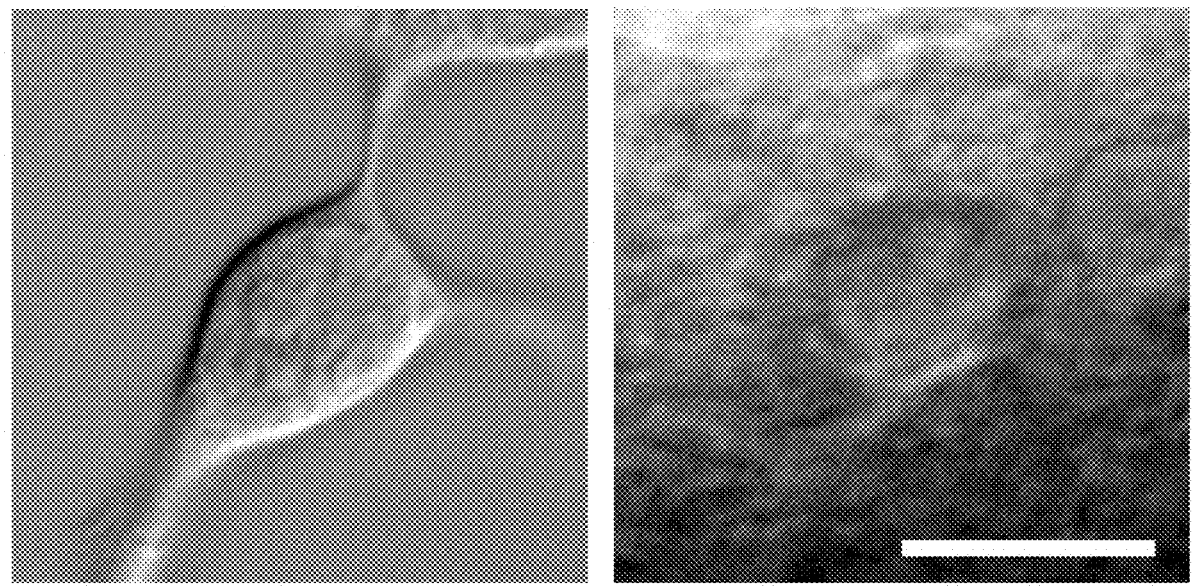
FIG. 1 depicts example images obtained with DIC microscopy (40× magnification). Left panel: cultured human embryonic kidney (HEK293) cell. Right panel: neuron in mouse brain tissue (400 µm thickness). The image on the right has high levels of imaging noise due to light scatter and interference due to organic material in surrounding tissue. Scale bar 10 am.

To facilitate an understanding of the principles and features of the various embodiments of the disclosure, various illustrative embodiments are explained below. Although exemplary embodiments of the disclosure are explained in detail, it is to be understood that other embodiments are contemplated. Accordingly, it is not intended that the disclosure is limited in its scope to the details of construction and arrangement of components set forth in the following description or examples. The disclosure is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named. In other words, the terms "a," "an," and "the" do not denote a limitation of quantity, but rather denote the presence of "at least one" of the referenced item.

As used herein, the term "and/or" may mean "and," it may mean "or," it may mean "exclusive-or," it may mean "one," it may mean "some, but not all," it may mean "neither," and/or it may mean "both." The term "or" is intended to mean an inclusive "or."

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose. It is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value. Further, the term "about" means within an acceptable error range for the particular value as determined by one of ordinary skill in the art, which will depend in part on how the value is measured or determined, i.e., the limitations of the measurement system. For example, "about" can mean within an acceptable standard deviation, per the practice in the art. Alternatively, "about" can mean a range of up to ±20%, preferably up to ±10%, more preferably up to ±5%, and more preferably still up to ±1% of a given value. Alternatively, particularly with respect to biological systems or processes, the term can mean within an order of magnitude, preferably within 2-fold, of a value. Where particular values are described in the application and claims, unless otherwise stated, the term "about" is implicit and in this context means within an acceptable error range for the particular value.

Throughout this disclosure, various aspects of the disclosure can be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

Throughout this description, various components may be identified having specific values or parameters, however, these items are provided as exemplary embodiments. Indeed, the exemplary embodiments do not limit the various aspects and concepts of the present disclosure as many comparable parameters, sizes, ranges, and/or values may be implemented. The terms "first," "second," and the like, "primary," "secondary," and the like, do not denote an order, quantity, or importance, but rather are used to distinguish one element from another.

It is noted that terms like "specifically," "preferably," "typically," "generally," and "often" are not utilized herein to limit the scope of the claimed disclosure or to imply that certain features are critical, essential, or even important to the structure or function of the claimed disclosure. Rather, these terms are merely intended to highlight alternative or additional features that may or may not be utilized in a particular embodiment of the present disclosure. It is also noted that terms like "substantially" and "about" are utilized herein to represent the inherent degree of uncertainty that may be attributed to any quantitative comparison, value, measurement, or other representation.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "50 mm" is intended to mean "about 50 mm."

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described hereinafter as making up the various elements of the present disclosure are intended to be illustrative and not restrictive. Many suitable materials that would perform the same or a similar function as the materials described herein are intended to be embraced within the scope of the disclosure. Such other materials not described herein can include, but are not limited to, materials that are developed after the time of the development of the disclosure, for example. Any dimensions listed in the various drawings are for illustrative purposes only and are not intended to be limiting. Other dimensions and proportions are contemplated and intended to be included within the scope of the disclosure.

DIC microscopy is widely used for observing unstained biological samples that are otherwise optically transparent. Combining this optical technique with machine vision could enable the automation of many life science experiments; however, identifying relevant features under DIC is often challenging. In particular, precise tracking of cell boundaries in a thick (>100 m) slice of tissue has not previously been accomplished. Herein is described a novel deconvolution algorithm that identifies and tracks these membrane locations.

Certain implementations provide cell segmentation and boundary tracking for DIC imagery of tissue slices. One of ordinary skill will recognize that certain aspects of the present disclosure may be utilized in various tasks. However, for ease of description, certain portions of the present disclosure are related to patch-clamp recording in brain tissue. In this experimental paradigm, brain tissue was sliced into 100-400 μm thick sections, each containing thousands of neurons embedded in a dense biological milieu. The slice was imaged with a microscope and glass probe was inserted into the tissue to sample the electrical activity of individual cells.

According to some embodiments, deconvolution of an image of a cell is performed to find a cell boundary. Certain aspects of the present disclosure may involve, as non-limiting examples, patch tracking, deconvolution, and segmentation. Patch tracking may include performing pattern recognition on portion of an image to identify a general area likely to contain cell boundaries (e.g., a cell). In some implementations, patch tracking may not be performed, and deconvolution may be performed on an entirety of an image or one or more subsets thereof. In some cases, the PF may remove noise from an organic image (e.g., an image of a brain slice). The PF may be tuned to statistical characteristics of a specific imaging technique and tissue sample and/or type. Deconvolution may utilize two-stages, PF and RWTV-DF. In some cases, the deconvolution may be performed on pre-filtered or unfiltered data. As discussed below in greater detail, the deconvolution may identify cell edges based on how well predicted edges describe the image data (e.g., least means square) and how connected the various edges are (e.g., by minimizing a summation of spatial derivatives of the image). The deconvolution may be applied to a sequence of images (e.g., video) and the derivatives may be weighted based on detected edges in a prior image in the sequence. The deconvolution may be iteratively performed, adjusting weights based on predicted edges, and then re-predicting the edges.

Examples

The present disclosure is also described and demonstrated by way of the following examples. However, the use of these and other examples anywhere in the specification is illustrative only and in no way limits the scope and meaning of the disclosure or of any exemplified term. Likewise, the disclosure is not limited to any particular preferred embodiments described here. Indeed, many modifications and variations of the disclosure may be apparent to those skilled in the art upon reading this specification, and such variations can be made without departing from the disclosure in spirit or in scope. The disclosure is therefore to be limited only by the terms of the appended claims along with the full scope of equivalents to which those claims are entitled.

Cell Membrane Tracking In Living Brain Tissue Using DIC Microscopy

The proposed algorithm extends the framework provided by others and was formulated as a regularized least-squares optimization that incorporates a filtering mechanism to handle organic tissue interference and a robust edge-sparsity regularizer that integrates dynamic edge-tracking capabilities. The described algorithm performed a deconvolution of the complex effects of DIC imaging integrated into a segmentation process and was not a direct segmentation of raw DIC images. Toward this end, the focus of this algorithm was specifically on cell boundary tracking instead of more typical deconvolution metrics such as least-square image reconstruction. Also described herein is a MATLAB toolbox for accurately simulating DIC microscopy images of in vitro brain slices. Building on existing DIC optics modelling, the simulation framework additionally contributed an accurate representation of interference from organic tissue, neuronal cell-shapes, and tissue motion due to the action of the pipette. This simulator allows users to better understand the image statistics to improve algorithms, as well as quantitatively test cell segmentation and tracking algorithms in scenarios where ground truth data is fully known. The simulation toolbox is freely available under GNU GPL at siplab.gatech.edu.

DIC Microscopy

DIC microscopy can enhance the contrast of an image by exploiting the fact that differences in the tissue often have different optical transmission properties that can be measured through the principle of interferometry. Specifically, the signal that is reconstructed by the algorithm is known as the OPL signal image, which is proportional to the underlying phase-shift. The OPL is defined as the product of refractive index and thickness distributions of the object relative to the surrounding medium. This OPL signal was denoted as $x_k \in \mathbb{R}^N$ (a vectorized form of the $\sqrt{N} \times \sqrt{N}$ OPL image's intensity values) and indexed in time by subscript k. DIC microscopy was used to amplify differences between the cell's refractive index and its environment to enhance visibility of the cell, thus highlighting edge differentials and giving the appearance of 3D relief. This effect can be idealized as a convolution between the optics' point spread function and the OPL, and denoted as $Dx_k$, where $D \in \mathbb{R}^{N \times N}$ is a matrix that captures the two-dimensional (2D) convolution against a kernel $d \in \mathbb{R}^{K \times K}$.

While more sophisticated DIC imaging models exist, for means of example, a kernel d corresponding to an idealized DIC model which is a steerable first derivative of Gaussian kernel may be used:

$$d(x, y) \propto -x\cos(\theta) \cdot e^{-\frac{x^2+y^2}{\sigma_d^2}} - y\sin(\theta) \cdot e^{-\frac{x^2+y^2}{\sigma_d^2}} \quad (1)$$

where $\sigma_d$ refers to the Gaussian spread and $\theta_d$ refers to a steerable shear angle. This model assumed an idealized effective point spread function (EPSF), where the condenser lens is infinite-sized and the objective is infinitely small (with respect to the wavelength). This model also ignored phase wrapping phenomenons by assuming that the specimen is thin enough or the OPL varies slowly enough such that it behaves in the linear region of the phase difference function. In practice, d(x, y) is discretized as d with a proportionality constant of 1, and with x and y each taking the discrete domain $$\left\{-\frac{K-1}{2}, -\frac{K-3}{2}, \ldots, \frac{K-3}{2}, \frac{K-1}{2}\right\} \quad (2)$$

DIC cell segmentation algorithms generally fall into three categories: direct, machine-learned, or deconvolution (or phasereconstruction) algorithms. Direct algorithms apply standard image processing operations such as low-pass filtering, thresholding, and morphological shape operations, but often are not robust and commonly work optimally on very low-noise/interference imagery. Machine-learned algorithms perform statistical inference learned from a large number of cell-specific training images (e.g., deep convolutional networks or Bayesian classifiers). Such algorithms have been shown to perform coarse segmentation surprisingly well in challenging scenarios (e.g., cells with complicated internal structures with low-noise/interference) for applications like cell-lineage tracking or cell-counting, yet they appear to lack precision for accurate cell-boundary localization. Certain related art deconvolution algorithms may be effective at retrieving the OPL for noisy microscopy images with little interference. However, organic tissue interference surrounding the cell negatively affected the reconstruction (and subsequently segmentation), especially around the edges of the cell.

Meanwhile, a reweighted ι1 aframework was found to produce robust reconstructions because each signal element's statistics were individually parameterized as opposed to having them globally parameterized by a single term (in the non-weighted 1 setup). This method, though very effective for the tracking of sparsely distributed signals, may not be directly applied since the signal space (i.e., the DIC imagery) distribution is inadequately sparse. Likewise, the reweighted TV minimization as a regularization method (in compressive sensing), for recovering the Shepp-Logan phantom from sparse Radon projections, demonstrating potential for application in bioimagery, is not capable of exploiting dynamical information in temporal data.

One of ordinary skill will understand that this is merely an example, and aspects of the disclosure may be applied to various imaging models.

Cell Simulator

Accurate cell simulators are a valuable tool for two reasons: they allow objective testing with known ground truth and provide insights into generative models that facilitate algorithm development. Currently, the vast majority of existing cell simulator packages focus specifically on fluorescence microscopy rather than DIC microscopy. While some simulators excelled at providing a large variety of tools for simulating various experimental scenarios and setups, most lacked simulation of synthetic cellular noise similar to that found in DIC microscopy images of brain slices (due to the presence of cellular tissue). Most simulators tend to target very specific types of cells and there have been initial efforts to organize and share cellular information (e.g., spatial, shape distributions) into standardized formats across simulators. Despite this, no existing simulator currently generates synthetic DIC imaging of neurons such as those used in patch clamp experiments for brain slices. To facilitate algorithm design and evaluation on the important problem of automated patch clamping, a MATLAB toolbox has been built and released for accurately simulating DIC microscopy images of in vitro brain slices.

Formulation of the Deconvolution Algorithm

Figure 2:
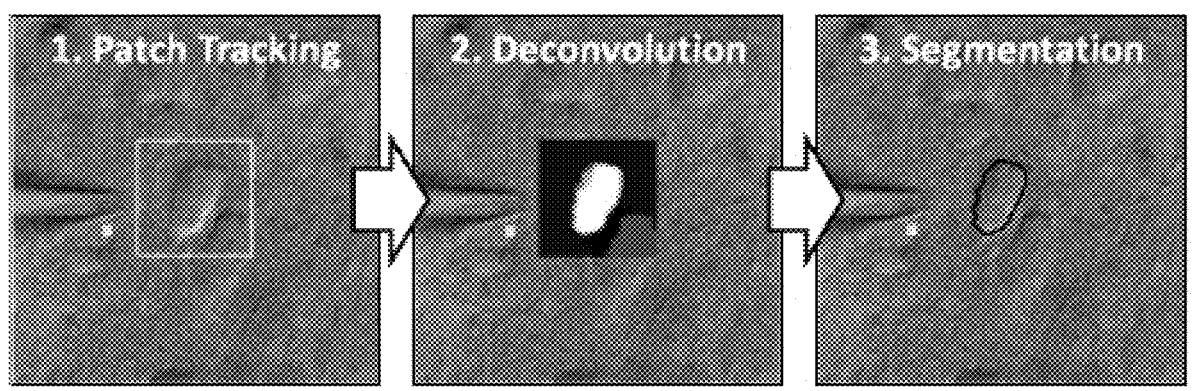
FIG. 2 depicts the example stages of the described imaging system. The full imaging system has three stages: patch tracking, deconvolution, and segmentation. In patch tracking, a user-defined template is provided for template matching and tracking spatial coordinates over time with a Kalman filter. In deconvolution, the patch is deconvolved to infer the optical path length (OPL) approximation. In segmentation, a global threshold is applied to yield a binary segmentation mask to determine the cell membrane location.

Certain aspects of the described systems and methods are designed to provide automated visual tracking of the membrane of a user-selected target cell (e.g., to guide a robotic patch clamping system). According to some embodiments, three general stages visualized by FIG. 2 are used. The first stage includes computer vision tracking techniques to identify the general patch of interest containing the target cell on the current frame (e.g., a current image of a video containing the cell). The second stage implements dynamic deconvolution to recover a time varying OPL image that can be used for segmentation. In some cases, good performance is retained when a foreign object (e.g., a recording pipette) overlaps with the cell by removing the foreign object from the image and performing inpainting. The third stage includes a segmentation on the output of the deconvolution, which was performed with simple thresholding. It is suggested that a simple segmentation strategy is sufficient after a robust deconvolution process.

Through the first stage, the deconvolution and segmentation algorithms may be run on a limited image patch size (e.g., 64×64, as a trade-off between speed and resolution) that was found by tracking gross motion in the image. For example, template matching (via normalized cross-correlation) may be performed on each frame using a user-selected patch (e.g., obtained via a mouse-click to associate coordinates of the image patch center with the targeted cell's center). Patch-tracking robustness may be improved by running a standard Kalman filter on the positional coordinates of the found patch (i.e., tracking a two-dimensional state vector of the horizontal and vertical location of the patch center). To increase efficacy with the correlation approach, a pre-processing stage may be used, for example, to eliminate lighting bias (i.e., uneven background subtraction) on each video frame. In some cases, quadratic least squares estimation (with a polynomial order of 2) may be used, but this is merely an example. In some cases, bias elimination may be applied to an entire video frame (rather than to each patch) for computational efficiency. Also, if the bias conditions were static throughout a video or multiple frames, the bias or other PF may be computed once, cached, then applied across multiple frames. While tracking the detailed cell membrane locations is challenging in the related art, tracking the general location of the patch containing the target cell can be done with very high accuracy.

Formulation of the PF+RWTV-DF Algorithm

Certain aspects of the present disclosure relate to a PF+RWTV-DF algorithm constructed of two distinct components: a PF operation, and the RWTV-DF deconvolution algorithm. The two parts played distinct yet important roles: PF performed interference suppression while the RWTV-DF deconvolution achieved dynamic edge-sparse reconstructions. However, this is merely an example, and, in some cases, the RWTV-DF may be utilized without PF.

Figure 3:
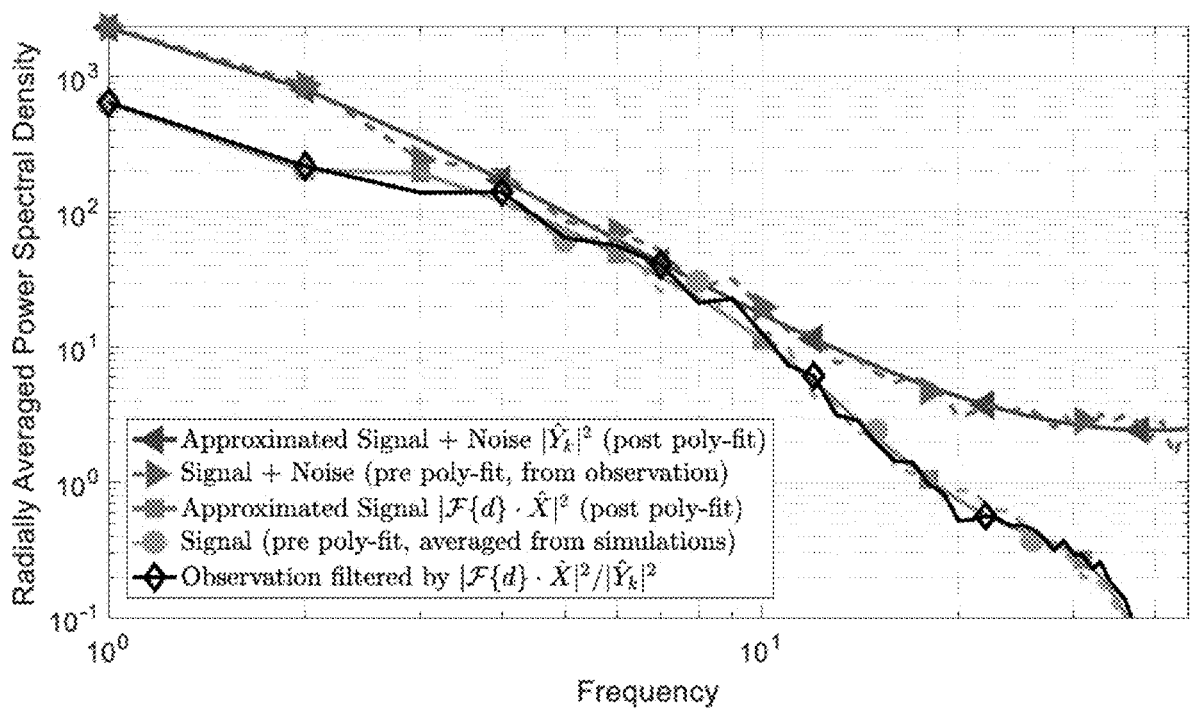
FIG. 3 shows radially averaged power spectral density (RAPSD) plots in log-scale from an example 64×64 cell patch. The Wiener filter utilized an approximation to the signal (in blue) and the signal-with-noise (in red) power spectral density modeled as a linear polynomial least-square fitting over the RAPSD. The signal approximation was computed by averaging the power spectral density of simulated cells. The signal-with-noise approximation was extracted from an observed patch. The final filtered spectrum is shown in black.
Figure 4:
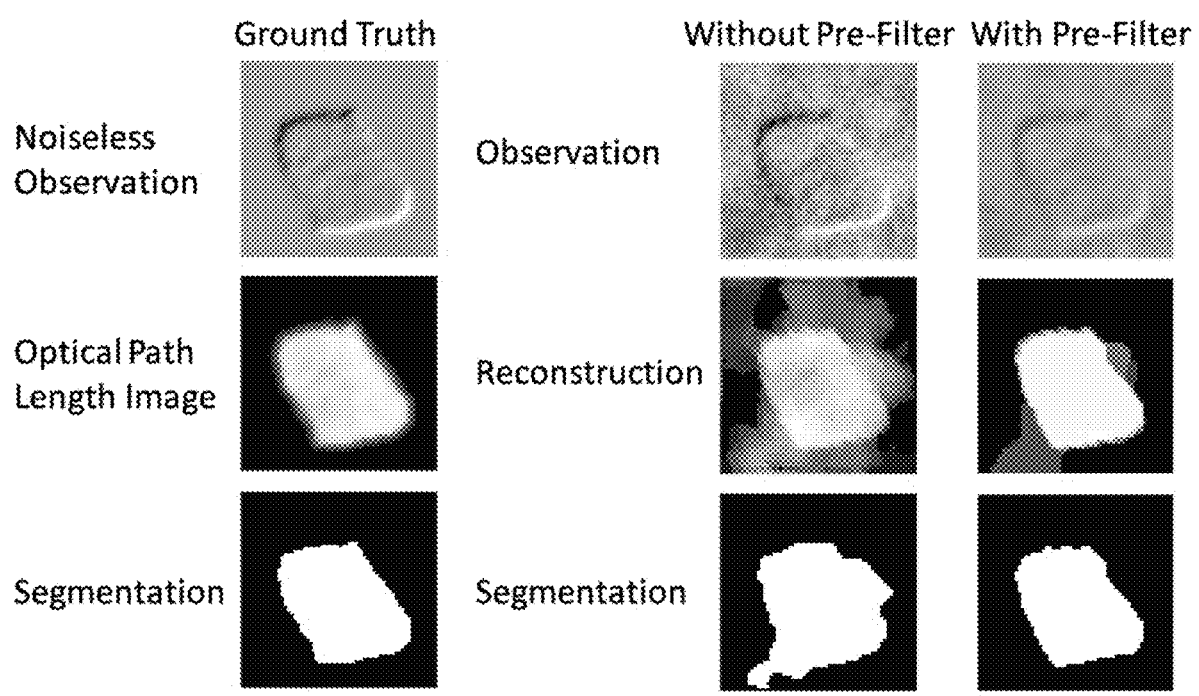
FIG. 4 shows the contribution of pre-filtering seen as interference-suppression. The first column of images pertains to the ground truth simulation. The second and third columns pertain to pre-filtering (PF)+re-weighted total variation dynamic filtering (RWTV-DF) (collectively, PF+RWTV-DF) to be performed without and with the pre-filter respectively. While the pre-filter blurred high frequency interference content, it also blurred the cell's edges. The pre-filtered observation has its edge integrity retained while suppressing surrounding interference found at the bottom left corner and immediate right of the cell; this results in an overall segmentation that is closer to the ground truth.

(1) PE: The presence of non-white Gaussian noise due to organic tissue interference caused challenges in recognizing membrane boundaries. In some instances, PDF may be used to estimate the interference-free observation, for example, by "whitening" the spectra associated with the observation and amplifying the spectra associated with the signal. Specifically, in some cases, the PF filter's design was derived using the Wiener filter and given in the spatial-frequency domain by:

$$|F_k|^2 = \frac{|\mathcal{F}\{d\} \cdot \hat{X}_k|^2}{|\mathcal{F}\{d\} \cdot \hat{X}_k|^2 + |\hat{N}_k|^2} = \frac{|\mathcal{F}\{d\} \cdot \hat{X}_k|^2}{|\hat{Y}_k|^2} \quad (3)$$

where $F_k$ is the spatial Fourier spectrum of the pre-filter, $\mathcal{F}\{d\}$ is the spatial Fourier transform of the DIC imaging function from Equation 1, $X_k$ is the OPL signal's spatial Fourier spectrum estimate, $N_k$ is the spatial Fourier spectrum estimate of $n_{organic}^k$ combined with $n_{sensor}^k$ and $\hat{Y}^k$ is the signal-plus-noise's spatial Fourier spectrum estimate. All spatial Fourier spectra were estimated using least-squares polynomial fits of the RAPSD, defined as a radial averaging of the DC-centered spatial-frequency power spectrum density. Intuitively, this estimated an image's underlying spectrum via a form of direction-unbiased smoothing. Specifically, the signal-only component $X_k$ was estimated from averaged RAPSDs from OPLs of simulated cells generated from the realistic simulation framework described herein, and estimated the combined signal-plus-noise spectra $\hat{Y}_k$ from the RAPSDs of observed images $y_k$. FIG. 3 illustrates the estimation process and effect of the pre-filter in the frequency domain. The positive contribution of the prefilter was highlighted in FIG. 4 in the segmentation algorithm described below.

(2) RWTV-DF

Given the edge-sparse nature of the data and the particular need for accuracy in the cell membrane locations during segmentation (in contrast to the more typical MSE minimization of the deconvolved image), the TV norm may be used as the core regularization approach for this algorithm. Specifically, in some cases, the calculated isotropic TV may be taken as:

$$\|x_k\|_{TV} = \sum_{i=1}^{N} \|T_i x_k\|_2 = \sum_{i=1}^{N} t_k[i], \quad (4)$$

where $T_i \in \mathbb{R}^{2 \times N}$ is an operator that extracts the horizontal and vertical forward-differences of the i-th pixel of $x_k$ into an $\mathbb{R}^2$ vector, whose $\ell^2$ norm is denoted as an individual edge-pixel $t_k[i]$. This basic regularizer was improved via an iterative estimation of weights on the individual edges through a Majorize-Minimization algorithm. However, this regularizer does not incorporate dynamical information for the tracking of moving edges.

To address this issue, a hierarchical Bayesian probabilistic model where dynamics are propagated via second-order statistics from one-time step to the next may be used designed such that the described method operates solely in the edge-pixel space. As will be understood in light of the present disclosure, the sparse edge locations at the previous frame provided strong evidence that there could be an edge nearby in the current frame. Edge locations may be modeled with a sparsity-inducing probability distribution with a parameter controlling the spread (i.e., variance) of the distribution. When previous data gave evidence for an edge in a given location, the parameter to increase the variance of the prior data in this location, thereby likely making it easier for the inference to identify the presence of the edge from limited observations. In contrast, when previous data indicated that an edge in a location was unlikely, this variance may be decreased thereby requiring more evidence from the observations to infer the presence of an edge.

Figure 5:
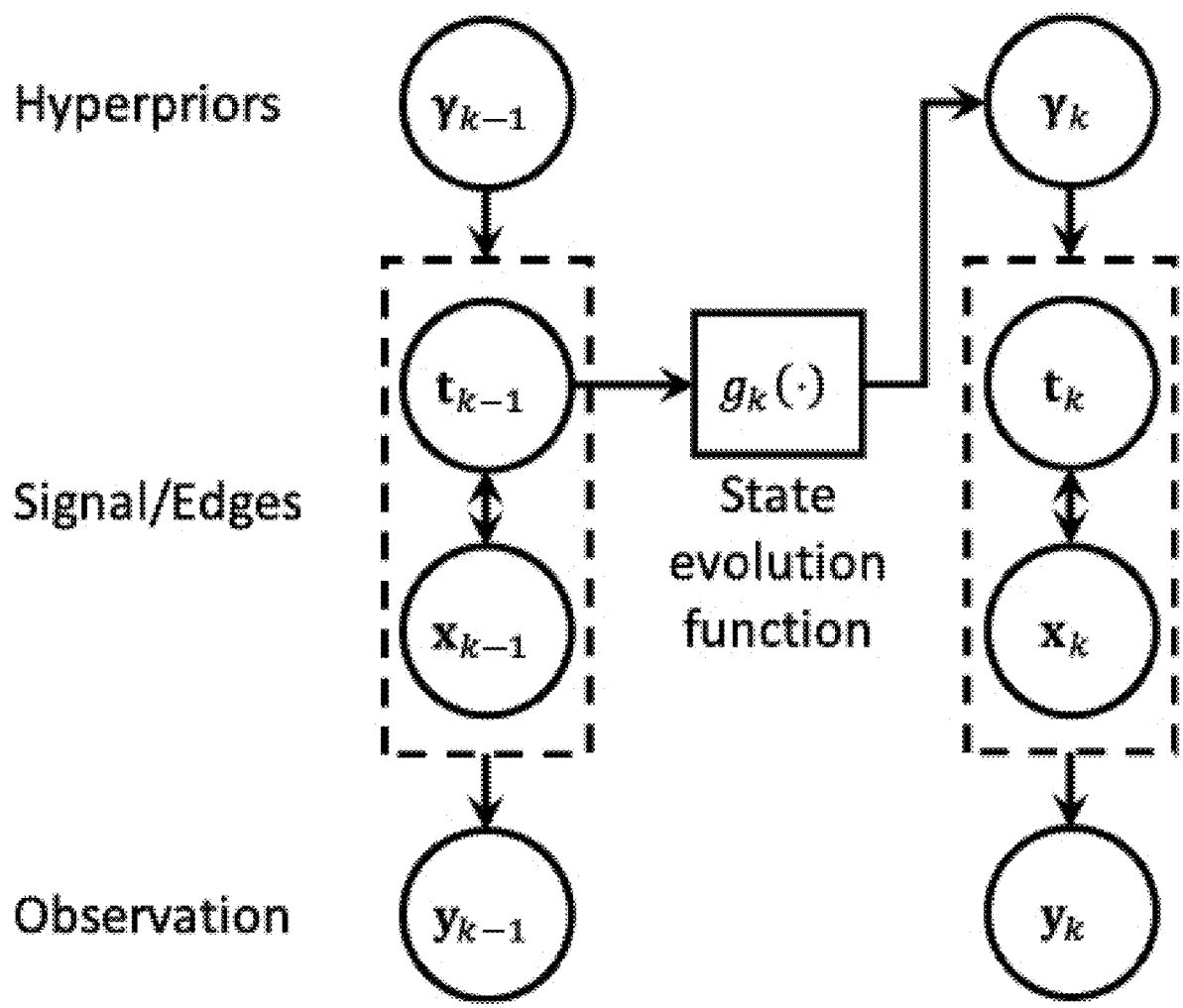
FIG. 5 shows a graphical model depicting the hierarchical Laplacian scale mixture model's Bayesian prior dependencies in the RWTV-DF algorithm. Prior state estimates of the signal edges were used to set the hyper-priors for the second level variables (i.e., variances of the state estimates), thereby implementing a dynamical filter that incorporates edge information into the next time step.

As a non-limiting example, at the lowest level of the hierarchy, the pre-filtered observations may be modeled conditioned on the OPL signal $x_k$ with a white Gaussian distribution:

$$p(F_k y_k \mid x_k) \propto e^{-\frac{1}{2\sigma^2}\|F_k y_k - D x_k\|_2^2} \quad (5)$$

where $F_k$ is the matrix operator describing 2D convolution (in the frequency domain) against the pre-filter $F_k$ described earlier by Equation 4. At the next level, the individual edge-pixels $t_k[i]$ may be assumed sparse and therefore best modeled with a distribution with high kurtosis but with unknown variance. One of ordinary skill will recognize that aspects of the present disclosure may be utilized for different optic models (i.e., optic models besides DIC) by modifying $F_k$ to fit the different optical models. Conditioning on a weighting $\gamma_k[i]$ that controlled the individual variances, the $t_k[i]$ may be modeled as random variables arising from independent Laplacian distributions:

$$p(t_k[i] \mid \gamma_k[i]) = \gamma_0 \frac{\gamma_k[i]}{2} e^{-\gamma_0 \gamma_k[i] \cdot |t_k[i]|} \quad (6)$$

where $\gamma_0$ is a positive constant. At the top-most level, the weights $\gamma_k[i]$ are themselves also treated as random variables with a Gamma hyperprior:

$$p(\gamma_k[i] \mid \theta_k[i]) = \frac{\gamma_k^{\alpha-1}[i]}{\theta_k^\alpha[i]\Gamma(\alpha)} e^{-\gamma_k[i]/\theta_k[i]} \quad (7)$$

where a is a positive constant, $\Gamma(\cdot)$ is the Gamma function, and $\theta_k[i]$ is the scale variable that controls the Gamma distribution's mean and variance over $\gamma_k[i]$. This top-level variable may be used to insert a dynamics model into the inference that controlled the variance of the prior being used to infer edge locations based on previous observations. FIG. 5 illustrates the multiple prior dependencies of the hierarchical Laplacian scale mixture model described in Equations 5, 6, and 7 using a graphical model.

Figure 6:
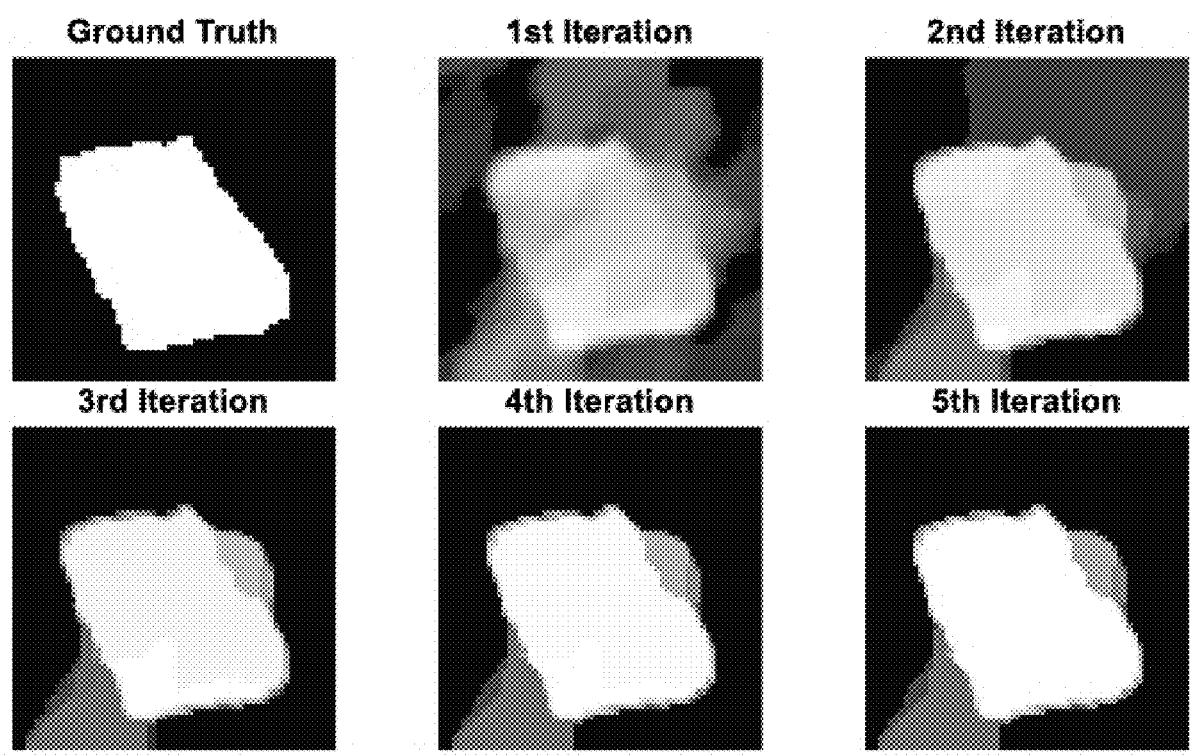
FIG. 6 shows the ground truth image that was the binary mask of a simulated image. Subsequent images reflected the iterations of reweighting process during deconvolution (iterations 1 through 5 respectively). Over the iterations, dominant edges were enhanced while weaker ones recede, resulting in piecewise smooth solutions that are amenable to segmentation.

To build dynamics into the model, it was observed that the Gamma distribution's scale variable $\theta_k[i]$ controlled its expected value (i.e., $E[\gamma_k][i] = \alpha \theta_k[i]$). A dynamic filtering approach was then designed to the problem of interest by using a dynamics model on the edge-pixels that set the individual variances $\theta_k[i]$'s according to predictions from the dynamics model $g_k(\cdot)$:

$$\theta_k[i] = \frac{\xi}{|g_k(t_{k-1})[i]| + \eta} \quad (8)$$

where $\xi$ is a positive constant and $\eta$ is a small constant that prevents division by zero. To illustrate the operation of this model, a strong edge-pixel in a previous frame (i.e., a large value of $t_{k-1}[i]$) set a small value of $\theta_k[i]$ (and respectively a small expected value of $\gamma_k[i]$), in turn making the Laplacian's variance large (i.e., $\mathrm{Var}[t_k[i]] = 2/(\gamma_0 \gamma_k[i])^2$). A large Laplacian variance implied a higher likelihood that the edge-pixel in the current frame was active (in contrast to the reverse situation where a weak edge pixel would result in a small Laplacian variance at the next time step). Therefore, this approach propagated second-order statistics (similar to classic Kalman filtering for Gaussian models) through the hyperpriors $\gamma_k$ using dynamic information via the evolution function $g_k(\cdot)$ at each time-step. One option for $g_k(\cdot)$ was a convolution against a Gaussian kernel (with its a proportional to expected motion variation), which expresses a confidence neighborhood of edge locations based on previous edge locations. As with any tracking algorithm, the tracking quality depended on the accuracy of the dynamics model and including better models (e.g., more accurate motion speeds, motion direction information based on pipette movement, etc.) would improve the performance of any approach. With a fixed dynamics function, for each frame the algorithm took a re-weighting approach where multiple iterations are used to adaptively refine the estimates at each model stage (illustrated for a simulated patch in FIG. 6).

The final optimization followed from taking the MAP estimate for Equations 5, 6, and 7 and applying the EM approach to iteratively update the weights. In some cases, the maximization step is given as a convex formulation $$\hat{x}_k^{(t)} = \underset{x \geq 0}{\mathrm{argmin}} -\log[p(x \mid \gamma_k^{(t)})] \quad (9)$$

$$= \underset{x \geq 0}{\mathrm{argmin}} \frac{1}{2}\|F_k y_k - Dx\|_2^2 + \gamma_0 \sum_{i=1}^{N} \gamma_k^{(t)}[i] \cdot \|T_i x\|_2.$$

In other words, $\hat{x}_k^{(t)}$ is the value of x for a given iteration (t) of a given image k (e.g., frame) that minimizes the cost function: $\frac{1}{2}\|F_k y_k - Dx\|_2^2 + \gamma_0^{(t)}\sum_{i=1}^N \gamma_k^{(t)}[i]\cdot\|T_i x\|_2$. In light of the present disclosure, of ordinary skill will recognize that the first portion of Equation 9 ($\frac{1}{2}\|F_k y_k - Dx\|_2^2$) represents the least mean square error of the prediction $x^{(t)}$ from the true image, while the second portion of Equation 9 ($\gamma_0'\Sigma_{i=1}^N \gamma_k^{(t)}[i]\cdot\|T_i x\|_2$) represents the total derivative value for the image for a given prediction $x^{(t)}$. The second portion describes how "connected" the predicted edges are in a statistical sense. The cost function balances the predicted error and the "connectedness" of the prediction.

DIC deconvolution can be particularly sensitive to uneven (i.e., non-matching) boundaries. Hence, the implementation of the matrix operator D, though application dependent, should be treated carefully. In some embodiments, a discrete convolutional matrix implementation that handled non-matching boundary could cause memory issues when N is large since D scales quadratically in size (though it could be mitigated using sparse matrices). Alternatively, in some embodiments, an FFT/IFFT surrogate implementation implies circular boundary conditions that need to be explicitly taken care of (e.g., via zero-padding). The expectation step may be using the conjugacy of the Gamma and Laplace distributions, admitting the closed-form solution $$\gamma_k^{(t+1)}[i] = \mathbb{E}_{p(\gamma|t_k^{(t)}[i])}[\gamma] = \frac{\kappa + 1}{\kappa \cdot |t_k^{(t)}[i]| + |g_k(\hat{t}_{k-1})[i]| + \eta} \quad (10)$$

where the Expectation Maximization (EM) iteration number is denoted by superscript t, $t_k^{(t)}[i] = \|T_i x_k^{(t)}\|_2$ is the estimate of the edge at iterate t, $t_{k-1}[i] = \|T_i x_{k-1}\|_2$ is the estimate of the edge at the previous time-step, $\gamma_0$ is the positive constant that controlled the weight of edge-sparsity against reconstruction fidelity, and x is the positive constant that controls the weight of the current observation against the dynamics prior. The Gaussian convolution implemented by $g_k(\cdot)$ effectively "smeared" the previous time-step's estimation of edges to form the current prior, accounting for uncertainty due to cell movement over time. In other words, $g_k(\cdot)$ ties the edge prediction of a current image to the edge prediction of the previous image in the sequence. The EM algorithm was initialized by setting all weights to 1 (i.e., $\gamma_k^{(0)}=1$) and solving Equation 9, which is simply (non-weighted) TV-regularized least squares. The reweighting iterations were terminated upon reaching some convergence criteria (e.g., $\|x^{(t)}-x^{(t-1)}\|_2/\|x^{(t)}\|_2<\varepsilon$, or the cost function value for $\hat{x}_k^{(t)}$ being less than a certain threshold (which may work as a stand-in for fit) or after a fixed number of reweights.

Object Removal via Inpainting

When an object (e.g., a pipette) draws near to a cell for interaction (e.g., patching), the object in the image patch can cause significant errors in the deconvolution process. Accordingly, in some cases, the PF+RWTV-DF algorithm may be modified to accommodate objects within the image. For example, an inpainting approach may mask away the object's pixels and inferred the missing pixels according to the same inverse process used for deconvolution. To begin, the object location may be tracked in the image with a similar template matching process as described above (which could be improved with positional information from an actuator if available). Simultaneously, an associated object mask (obtained either via automatic segmentation or manually drawn) was aligned and overlaid on top of the cell image patch using the updated pipette locations. This object mask overlay may take the form of a masking matrix $M \in \{0, 1\}^{M \times N}$ whose rows are a subset of the rows of an identity matrix, and whose subset is defined by pixel indices outside the pipette region. The original filtered observation $F_k y \in \mathbb{R}^N$ is reduced to $M F_k y \in \mathbb{R}^M$ (with $M \leq N$) while the convolution operator becomes MD. The inpainting version of Equation 9 is $$\hat{x}_k^{(t)} = \underset{x \geq 0}{\arg\min} \frac{1}{2}\|mF_k y_k - MDx\|_2^2 + \gamma_0 \sum_{i=1}^{N} \gamma_k^{(t)}[i]\|T_i x\|_2. \quad (11)$$

Pixels are removed in the object region from the data used in the deconvolution, but the algorithm may infer pixel values consistent with the statistical model used for regularization.

Reweighting Modification

In some implementations, solving the deconvolution problem (i.e., Equations 9 and 10 described above) at the current video frame in real-time may be computationally expensive. In implementing the described algorithm, the main computational bottleneck lies in solving the expensive optimization of Equation 9. In some implementations, ADMM may be used to solve Equation 9. As will be understood by one of ordinary skill, ADMM framework is itself also iterative in nature, where the numerical precision of the method is proportional to the number of iterations the solver carries out. For very high precision, the number of iterations would easily run into the thousands. Thus, solving Equation 9 with high precision (e.g., before reweighting in Equation 10) may take significant time, and request significant and computing power. However, in some implementations, RWTV-DF is merged with ADMM iterations under a single solver "umbrella". By drastically reducing the time spent on producing high precision solutions in each iteration of Equation 9, and performing more rounds of reweighting, high precision may be had for a final edge estimation for a given frame without requiring high precision estimations in each iteration.

Figure 18:
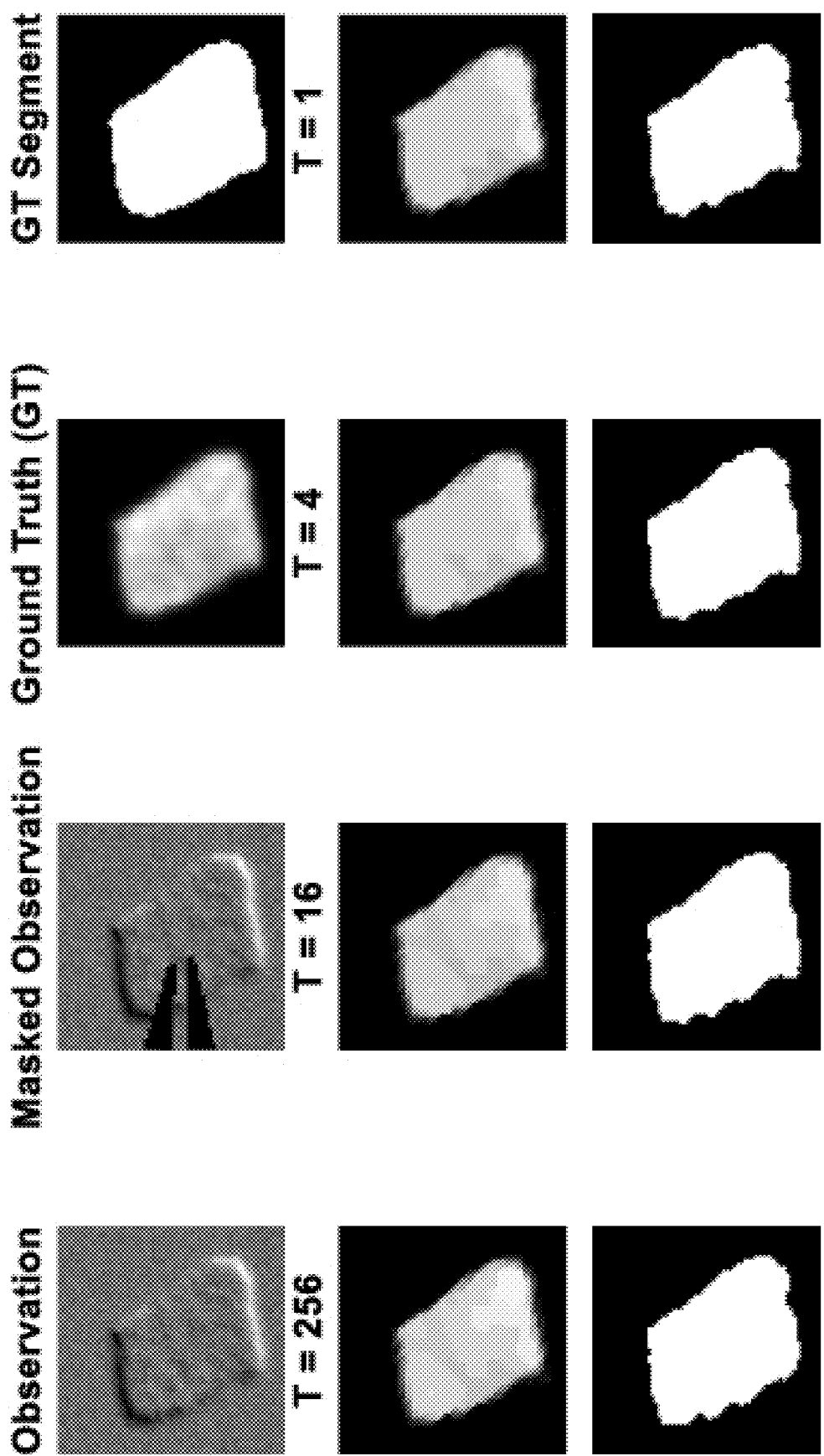
FIG. 18 illustrates deconvolution with inpainting for a single cell with different iterations of ADMM between reweighing according to an example implementation of the present disclosure.
Figure 19:
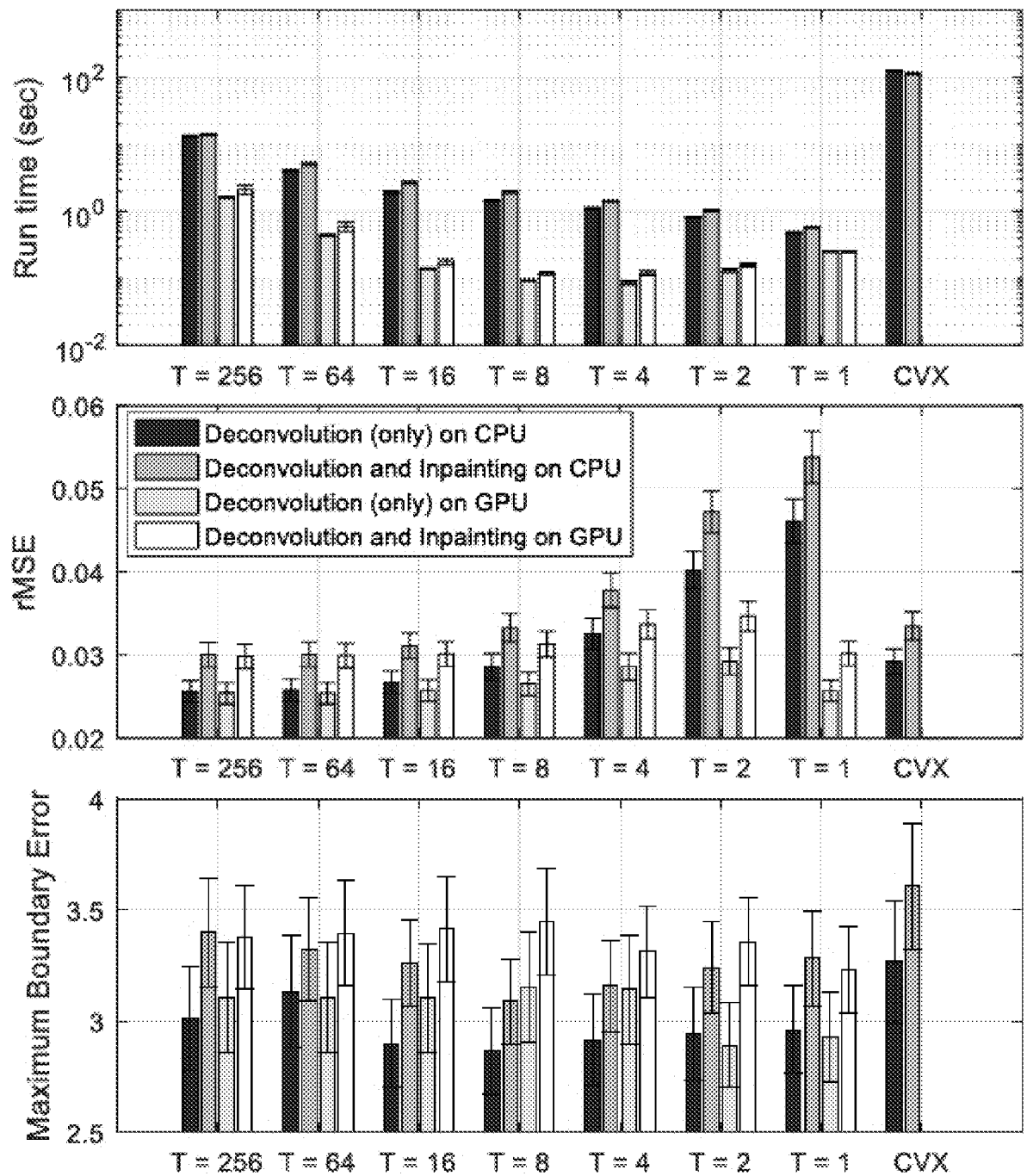
FIG. 19 shows aggregated statistics of RWTV-ADMM across for different iterations of ADMM between reweighing over 100 trials according to an example implementation of the present disclosure.

FIG. 18 illustrates example edge determinations for a given frame for different iterations of ADMM between reweighing T. Meanwhile, FIG. 19 illustrates aggregated statistics of RWTV-ADMM for different iterations of ADMM between reweighing T according to an example implementation. Thus, as can be seen, certain implementations may increase edge determination speed by utilizing lower fidelity while selective increasing iteration times.

Results

Experimental Conditions

The performance of an implementation of the inventive algorithm was evaluated by using a cell simulator that generates synthetic DIC imagery of rodent neurons in brain slices. Herein is shown the simulation framework and its realism is demonstrated by comparisons against data.

Figure 7:
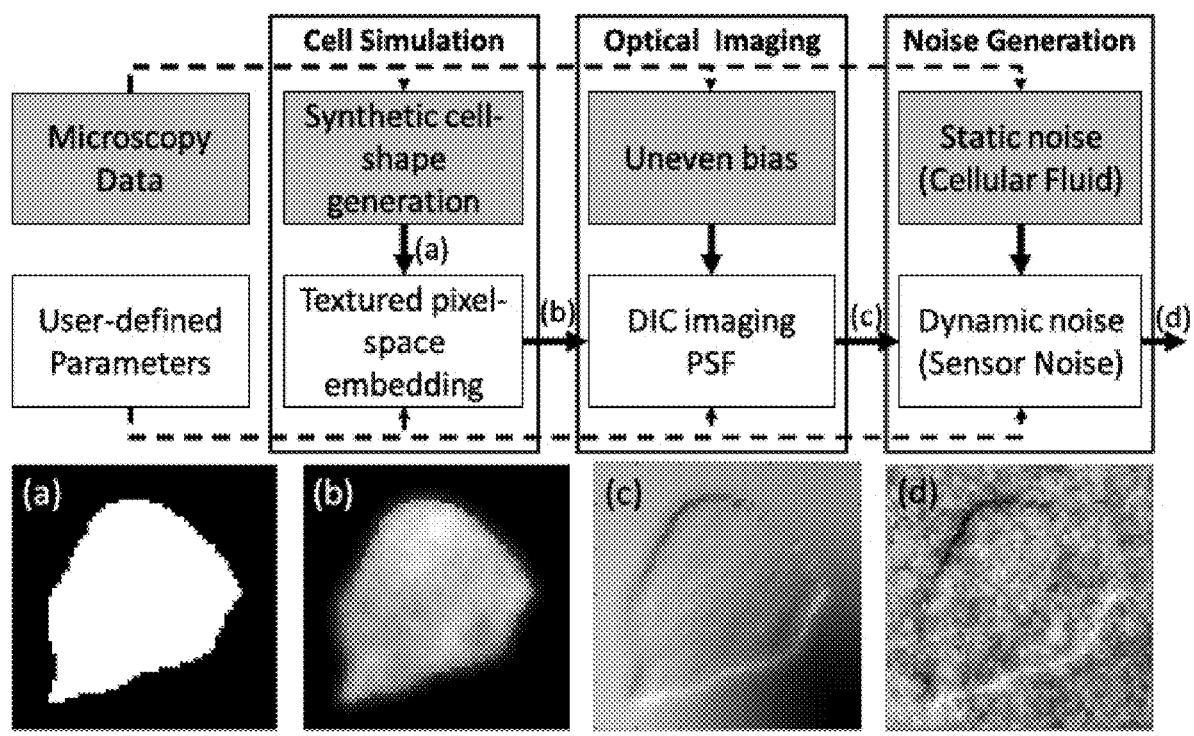
FIG. 7 shows a block diagram of the cell simulator. Gray blocks: generative models that learn from available data. White blocks: generative models that rely on user-parameters. The respective images are outputs from the various stages of the simulator, including (i) Binary image of synthetic cell shape (ii) Textured OPL image showing light transmission through tissue (iii) Received image through DIC optics and (iv) Final image with noise and interference.

Most cell simulators can be described as having three distinct stages: cell-shape generation, optical imaging, and noise generation. The simulation framework implemented for this method used these same three stages (shown in FIG. 7), adapting general approaches used in the literature for each stage so that the simulated data reflects the statistics of the DIC microscopy images for in vitro brain slice electrophysiology. In the first stage, a synthetic cell-shape was generated and embedded into the pixel-space as an ideal OPL image (i.e., the ground truth). In the second stage, the OPL image was transformed using a convolution against an idealized point spread function that approximately described the DIC microscope's optics. Lastly, interference from static components (e.g., organic material) and dynamic noise components (e.g., the image acquisition system) are generated and incorporated into the image during the third stage. Herein, existing general approaches were used to build and validate the model components in the simulator using real DIC imagery of in vitro brain slices from adult (P50-P180) mice. This simulator is unique in that it is tailored to simulate this type of cells. Full implementation details for this simulator are discussed below.

To evaluate the realism of synthetically generated cell-shapes, several of the shape features were compared to actual hand-drawn cell shapes from rodent brain slice imagery using four dimensionless shape features:

(1) Aspect Ratio was defined as the ratio of minor axis lengths to major axis lengths. The major/minor axis was determined from the best fit ellipsoid of the binary image.

(2) Form factor (sometimes known as circularity) was defined as the degree to which the particle is similar to a circle (taking into consideration the smoothness of the perimeter, defined as $$\frac{4\pi A}{P^2}$$

where A is area and P is the perimeter.

(3) Convexity was a measurement of the particle edge roughness, defined as $$\frac{P_{cvx}}{P}$$

where $P_{cx}$ is the convex hull perimeter and P is the actual perimeter.

(4) Solidity was the measurement of the overall concavity of a particle, defined as $$\frac{A}{A_{cvx}}$$

where $A_{cvx}$ is the convex hull area and A is the image area.

Figure 8:
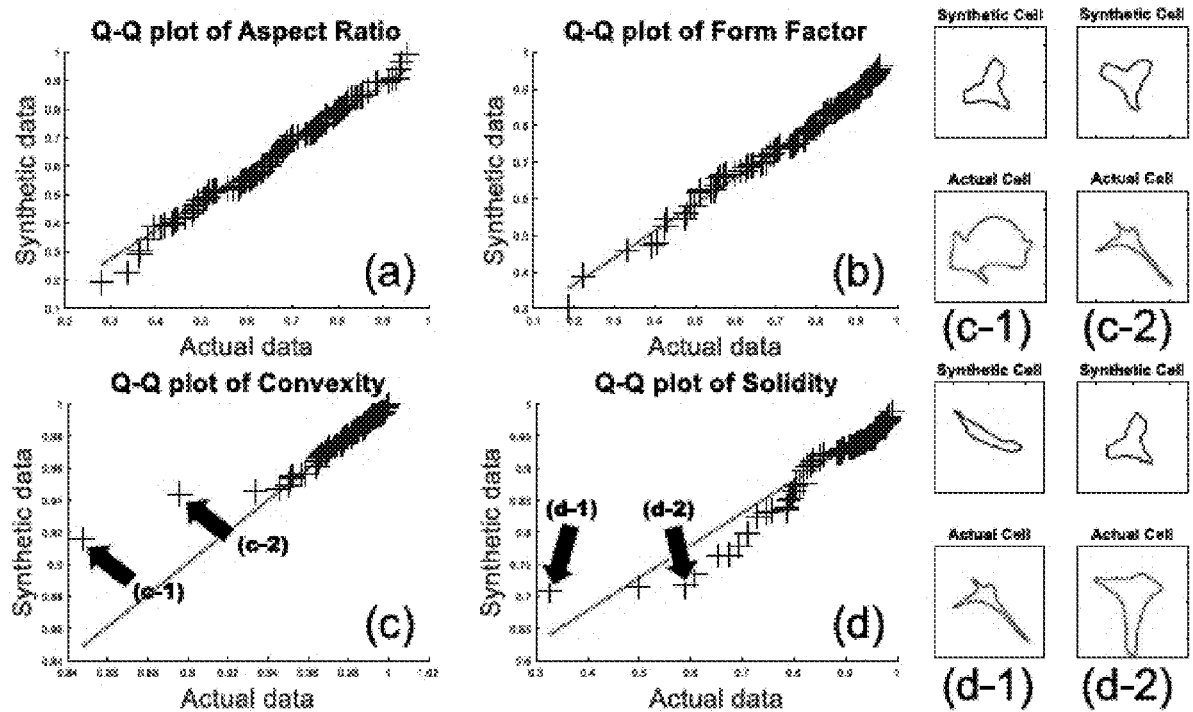
FIG. 8 shows quantile-quantile plots visualized similarities between the characteristics of simulated and actual cell-shapes. Distributions were compared for the following shape-features: aspect ratio (top left), form factor (top right), convexity (bottom left), and solidity (bottom right) as defined in the text. (c-1, c-2, d-1, d-2) Several outlier pairs from the convexity and solidity plots are identified and shown. The outlier pairs appeared to be caused by actual cell shape outlier statistics that are underrepresented (due to lack of training examples) and thus not fully captured by the model.

Using 50 shape-coordinates per cell, 115 synthetic cells were generated. The quartile-quartile plots in FIG. 8 showed that all four features are similarly distributed, demonstrating that the simulation renders realistic cell shapes for rodent in vitro brain slices.

Figure 9A:
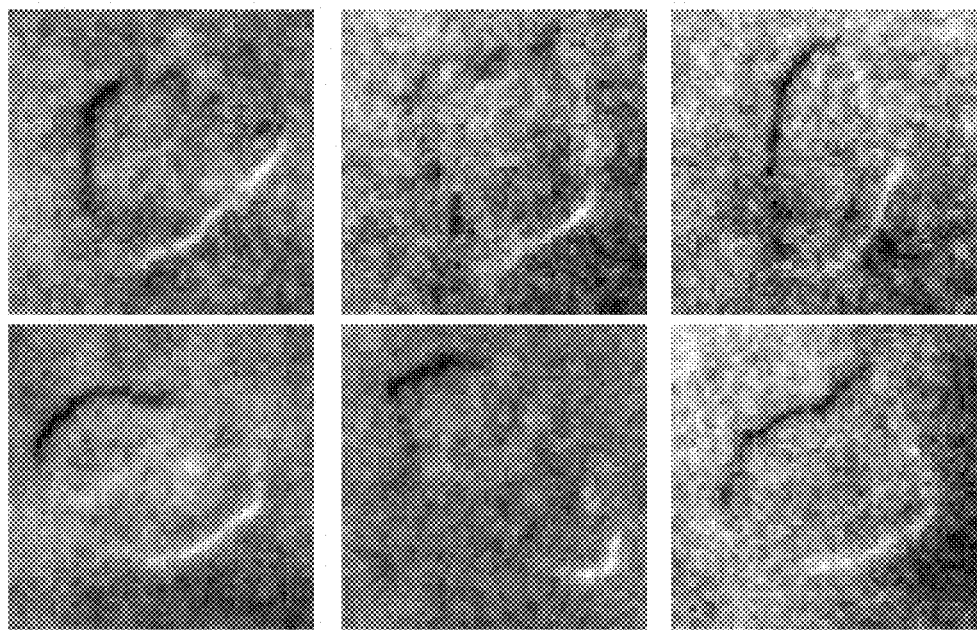
FIGS. 9A-9B show the general qualitative similarity between randomly drawn samples of (FIG. 9A) synthetically generated DIC cell images using the proposed simulator, and (FIG. 9B) actual DIC microscopy images of rodent neurons. Similarities in imagery characteristics included: (1) DIC optical features as shown by the three-dimensional (3D) relief which were highlighted by the high/low intensity 'shadows' in the cell edges, (2) organic interference which appeared as Gaussian noise with a frequency profile, (3) cell shapes as demonstrated by the cell shapes' organic and natural contours, and (4) uneven lighting bias as shown by the smooth but uneven background gradient.
Figure 9B:
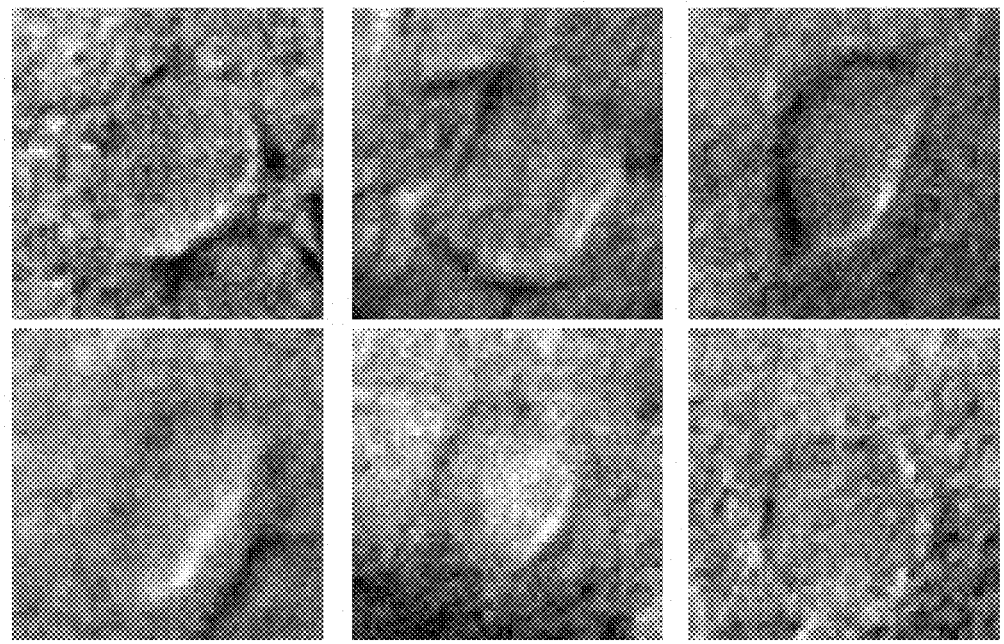

Several simulation images were generated in FIG. 9 for visual comparison against actual cell images. The following user-defined parameters (as defined in Table I) were used: image size was 60×60, cell-rotation ($\theta_{rot}$) was randomized, cell-scaling defined as factor of image width was $\gamma_{scale}=0.8$, DIC EPSF parameters were $\{\theta_d=2250, \sigma_d=0.5\}$, dynamic noise parameters were $\{A_g=0.98, \sigma_g=0.018, A_p=20.6, \lambda_p=10^{-10}\}$, and SNR $\chi=-1$ dB. Cell shapes were randomly generated based on learned real cell-shapes, a lighting bias was taken randomly from actual image patches, and organic noise was generated using a RAPSD curve learned from real DIC microscopy images. In general, the synthetic and actual cells were qualitatively similar in cell shapes and noise textures.

TABLE I

User-Defined Simulator Properties

| Parameter | Description |
|---|---|
| M | Image size (i.e., M × M pixel-image) |
| $\theta_{rot}$ | Rotation angle of cell-shape |
| $\gamma_{scale}$ | Scaling factor of cell-shape within image |
| p | Persistence of OPL surface texture |
| $\{\sigma_d, \theta_d\}$ | DIC imaging function parameters (Eq. (1)) |
| $\{A_g, \sigma_g\}$ | Dynamic noise Gaussian parameters (Eq. (15)) |
| $\{A_p, \lambda_p\}$ | Dynamic noise Poisson parameters (Eq. (15)) |
| $\chi$ | SNR (in dB) of final image (Eq. 16) |

Segmentation of Synthetic Data

The implementation of the PF+RWTV-DF algorithm was tested on synthetic cell data and compared its performance against the state-of-the-art deconvolution algorithms such as least-squares regularized by ι1 and TV (L1+TV), least-square regularized by ι1 and Laplacian Tikhonov (L1+Tik), and least-square by regularized re-weighted ι1, weighted Laplacian Tikhonov, and weighted dynamic filtering (RWL1+WTik+WDF). The deconvolution from each algorithm is then segmented using a global threshold to produce a binary image mask for algorithmic evaluation.

For evaluation, three boundary metrics were employed that captured errors relevant to the process of patch clamping. The metrics ABE, MBE, and VBE measured the (average, maximum, and variance of) distance errors between the approximated cell boundary and the actual cell boundary around the entire membrane of the cell at each video frame. Specifically, these metrics captured the statistics of the distance errors between the actual and estimated cell boundaries as the pipette tip approaches the cell membrane in a straight path (directed towards the true centroid).

To compute these metrics, first potential pipette paths were discretized towards the true centroid using a set of lines $\{l_a\}$, defined as lines that start at the true centroid and that infinitely extend through each point $p_a$ in the set of ground truth contour pixels $\{A\}$. Next, traveling along each $l_a$ toward the centroid we found the intersecting point in the set of estimated contour pixels $\{B\}$, defined as $p_{a,B}=\arg\min_{p_b \in B}\|p_b-p_a\|_2$ s.t. $p_i \in l_a$, where are points on the line $l_a$. In other words, found were the points that the algorithm that would identify as the membrane location during every hypothetical approach direction of the pipette. The $\|p_b-p_a\|_2$ in the objective considers only orthogonal projections of $p_b$ unto the line $l_a$ (since it is a minimization), and it searches over all of B to find the $p_b$ whose orthogonal projection distance is minimal. Note that that due to the contour discretization, pa,B does not lie exactly along $l_a$ but rather close to it on some $p_b \in B$. With each discretized boundary error expressed as $\varepsilon(a, B)=\|p_{a,B}-p_a\|_2$, the metrics are then defined as:

$$ABE(A, B) = \frac{1}{\|A\|_0} \sum_{a \in A} \varepsilon(a, B) \quad (12)$$

$$MBE(A, B) = \max_{a \in A} \varepsilon(a, B)$$

$$VBE(A, B) = \frac{1}{\|A\|_0 - 1} \sum_{a \in A} (\varepsilon(a, B) - ABE(A, B))^2$$

Figure 10:
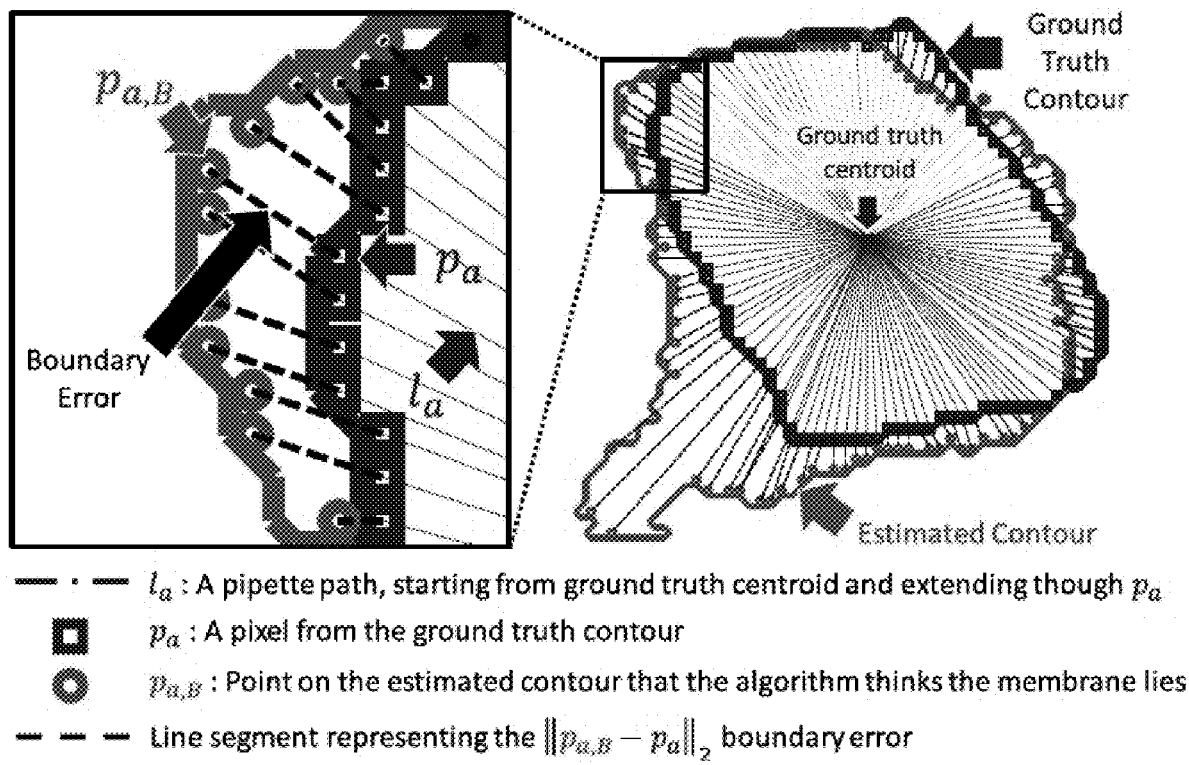
FIG. 10 shows boundary error metrics. Each blue line $l_a$ represents an approach direction of a pipette towards the ground truth centroid. $p_{a,B}$ represents the point where the algorithm thinks the membrane is. Individual boundary errors are computed as the distance $\|p_{a,B}-p_a\|_2$ and represented as black dotted lines. The average of all errors constitutes the average boundary error (ABE), the maximum constitutes the maximum boundary error (MBE), and the variance of errors constitutes the variance of boundary errors (VBE).

FIG. 10 illustrates the terms involved in these error metric computations.

100 videos of synthetic cell patches (each video contains 64×64 pixels×100 frames) were generated using the proposed cell simulator with DIC EPSF parameters $\sigma_d=0.5$ and $\theta_d=2250$ (assumed to be known either by visual inspection to accuracy of ±15°) or more accurately by using a calibration bead). By physically relating real cells to simulated cells, the relationship between physical length and pixels was determined to be approximately 3.75 pixels per 1.0 μm.

For the algorithms L1+TV, L1+Tik, and RWL1+WTik+WDF, the parameters for sparsity (β) and smoothness (γ) were tuned via exhaustive parameter sweep on the first frame of the video (to find the closest reconstruction/deconvolution by the ι2 least squares sense). Specifically, the sweep was conducted over 10 logarithmically spaced values in the given ranges: L1+TV searched over [$10^{-3}$, $10^{-9}$] for β and [$10^{-1}$, $10^{-5}$] for γ, L1+Tik searched over [$10^{-3}$, $10^{-9}$] for β and [$10^{-1}$, $10^{-7}$] for γ, and RWL1+WTik+WDF searched over [$10^{-3}$, $10^{-9}$] for β and [$10^{-1}$, $10^{-5}$] for γ. L1+Tik (the non-reweighted version) was used in all experiments because it was experimentally found to be better performing compared to the reweighted version; reweighting over-induced sparsity of pixels, which is not advantageous to segmentation in this particular application. For RWL1+WTik+WDF, the dynamics parameter was set to be $\delta=1.0\times10^{-3}$, with a maximum of 80 reweighting steps (where convergence is fulfilled before each reweighting). For PF+RWTV-DF (Equations 9, 10), $\gamma_0=3.0\times10^{-4}$ and $\kappa=5$ was fixed, with four reweighting steps (where convergence is fulfilled before each reweighting). The programs specified by L1+TV, RWL1+WTik+WDF, and PF+RWTV-DF were solved using CVX, while L1+Tik was solved using TFOCS.

Figure 11:
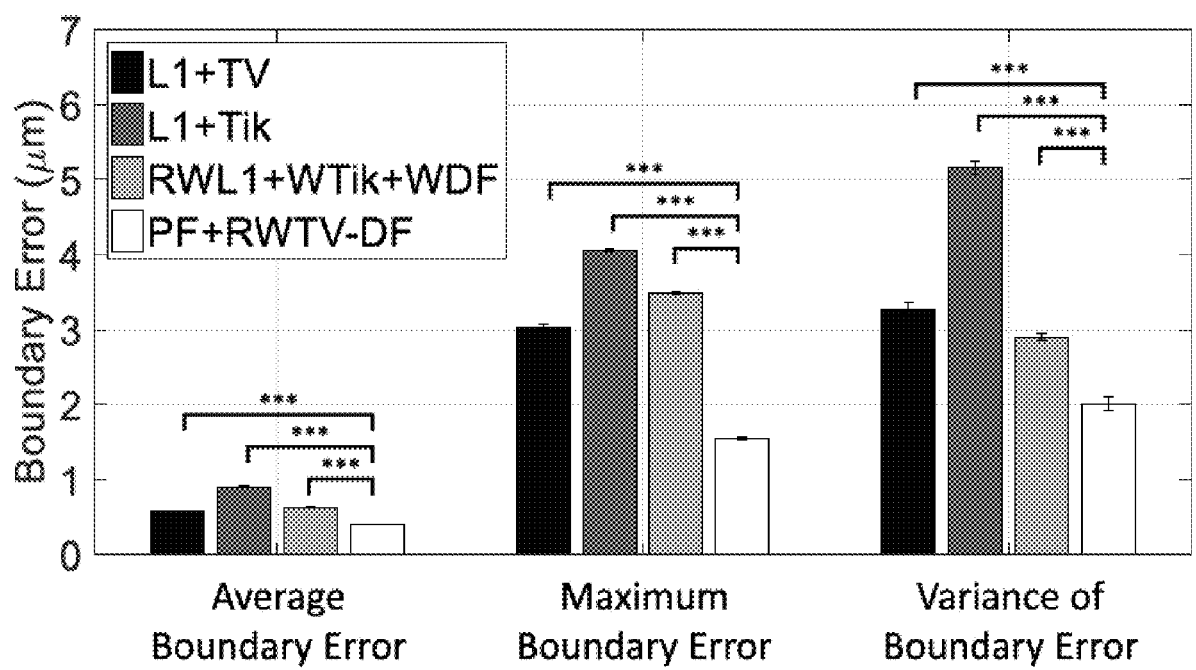
FIG. 11 shows average boundary errors ABE, MBE, and VBE for each of the algorithms across 100 video trials of simulated data. ABE/MBE/VBE was aggregated from 100 frames of 100 trials (i.e., 10,000 data points). The PF+RWTV-DF algorithm was found to have a state-of-the-art performance, showing statistically significant improvements in ABE/MBE/VBE compared to other algorithms (p≤0.001, denoted by the three stars based on paired t-tests).
Figure 12A:
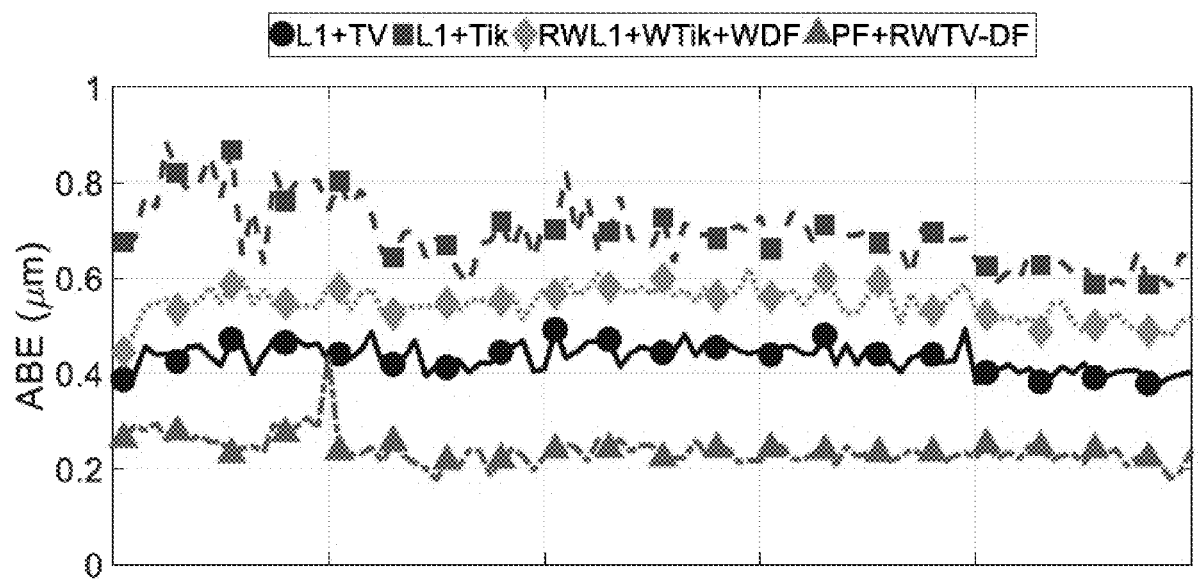
FIGS. 12A-12E show ABE, MBE, and VBE evolving with time are shown from (FIG. 12A) to (FIG. 12C) (respectively) for a single representative video (Trial #4) of a simulated DIC microscopy cell with 100 video frames after deconvolution and segmentation using four different algorithms. The images in (FIG. 12D) are snapshots of the deconvolution output at frame 100, and the images in (FIG. 12E) are their respective segmentations.
Figure 12B:
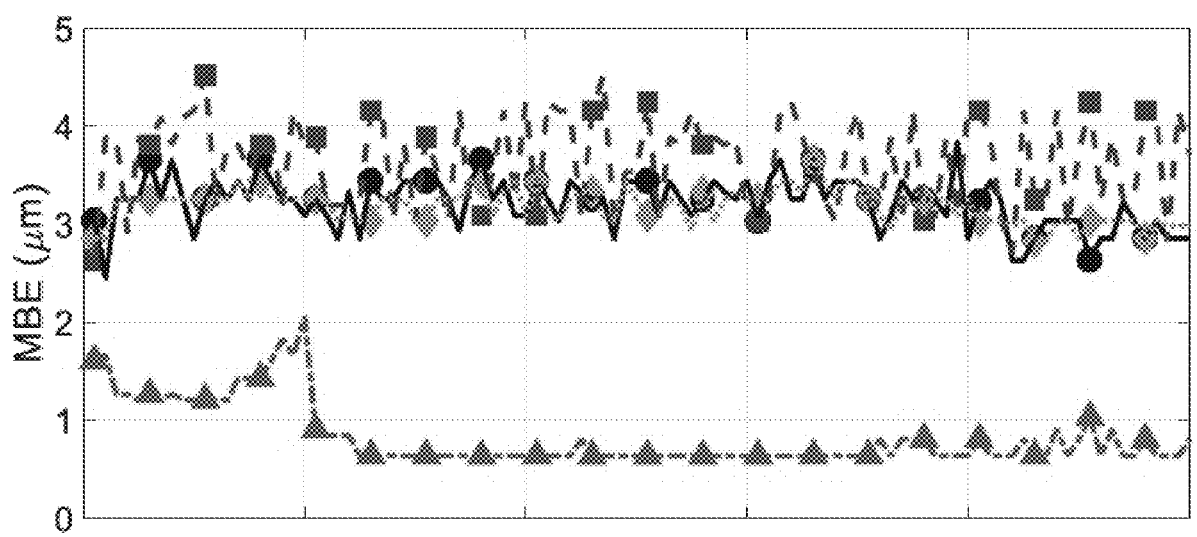
Figure 12C:
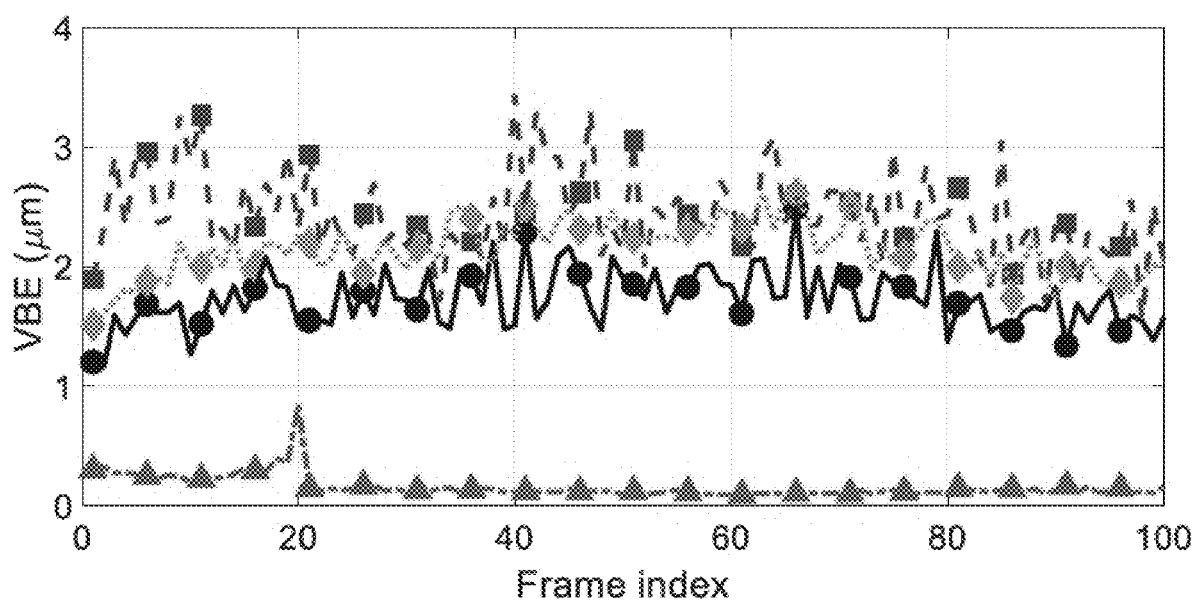
Figure 12D:
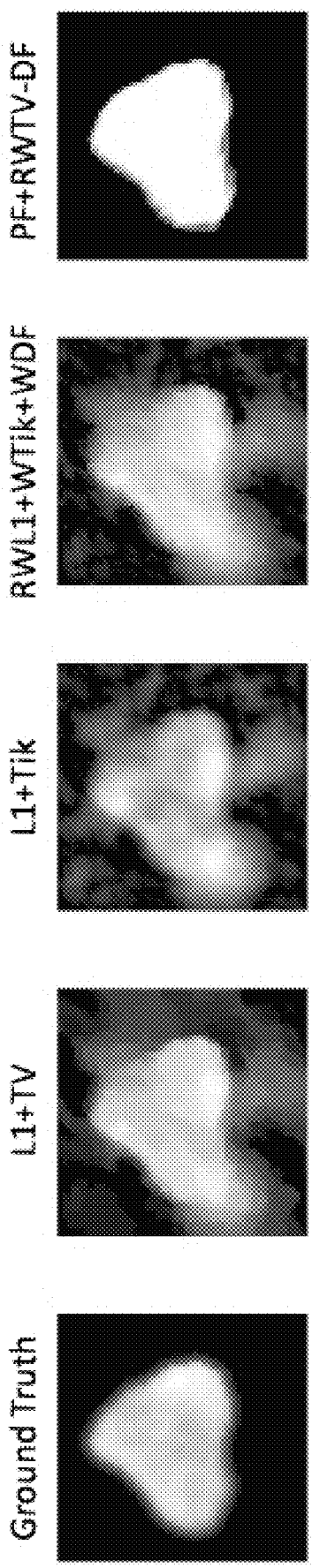
Figure 12E:
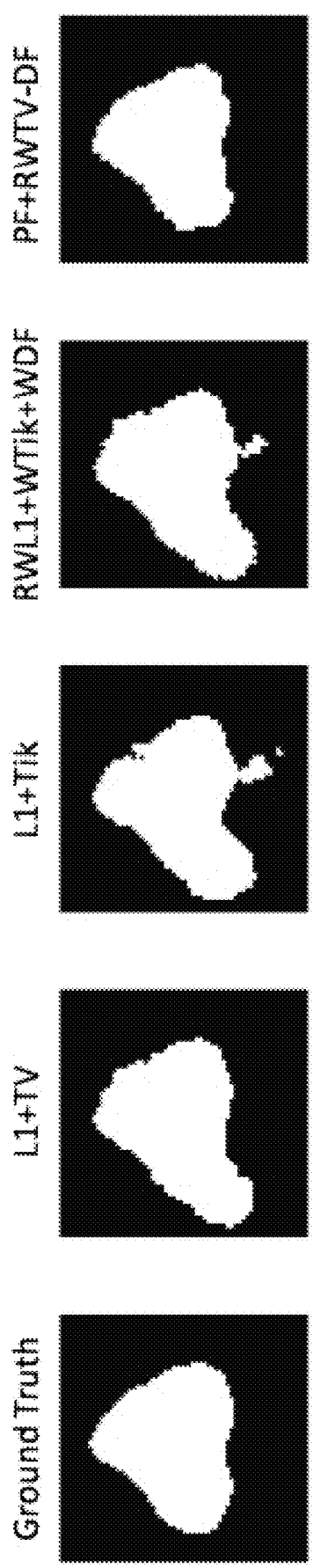

FIG. 11 reflects statistics of the respective algorithms from each of the 100 frames from the 100 video trials. The height of each bar refers to the average of ABE/MBE/VBE while the error bars refer to ±1 standard error of the ABE/MBE/VBE over the 100 video trials. PF+RWTV-DF was the best performing algorithm in the three metrics, and there was a significant difference (p≤0.001) between PF+RWTV-DF and the other algorithms for all metrics. Notably, PF+RWTV-DF resulted in boundary tracking errors on the order of 1-2 µm, which is comparable to the error in mechanical pipette actuators.

The implemented edge reweighing strategy is adaptive by design, making it very attractive in practice because it requires minimal parameter fine-tuning. The algorithm's performance was responsive to the smoothness parameter (effective range being $\gamma \in [2.0 \times 10^{-4}, 4.0 \times 10^{-4}]$) and the dynamics parameter (effective range being $\kappa \in [10^0, 10^2]$), yet not over-sensitive: the inventive algorithm's superior results were from fixed parameters ($\gamma$, $\kappa$) across all trials, while other algorithms required exhaustive two-parameter sweeps ($\beta$,$\gamma$) for each synthetic video trial.

FIG. 12 shows one representative trial (Trial #4) in the time-series to observe the qualitative differences between the algorithms. It was observed that the PF+RWTV-DF reconstruction has a fairly flat magnitude (for pixel values within the cell) compared to the other reconstructions. The proposed algorithm's inherent segmentation capability under such high-interference synthetic data is apparent from these results. Although PF+RWTV-DF reconstruction lost some cell details (i.e., in an ι2 reconstruction sense), the reduction in surrounding interference served to improve the boundary identification at the segmentation stage. On the other hand, the other algorithms produced reconstructions that contained significant surrounding interference, resulting in distorted edges in their subsequent segmentations (that may require further image processing to remove).

Segmentation of Real Data

In addition to the synthetic data where ground truth was known, the algorithms were also tested on in vitro DIC microscopy imagery of rodent brain slices from a setup. For each algorithm, a parameter search was performed using a brute-force search to find the parameters that best segmented the cell by means of visual judgement. The DIC EPSF was estimated visually to be $\sigma_d$=0.5, $\theta_d$=2250°.

Figure 13A:
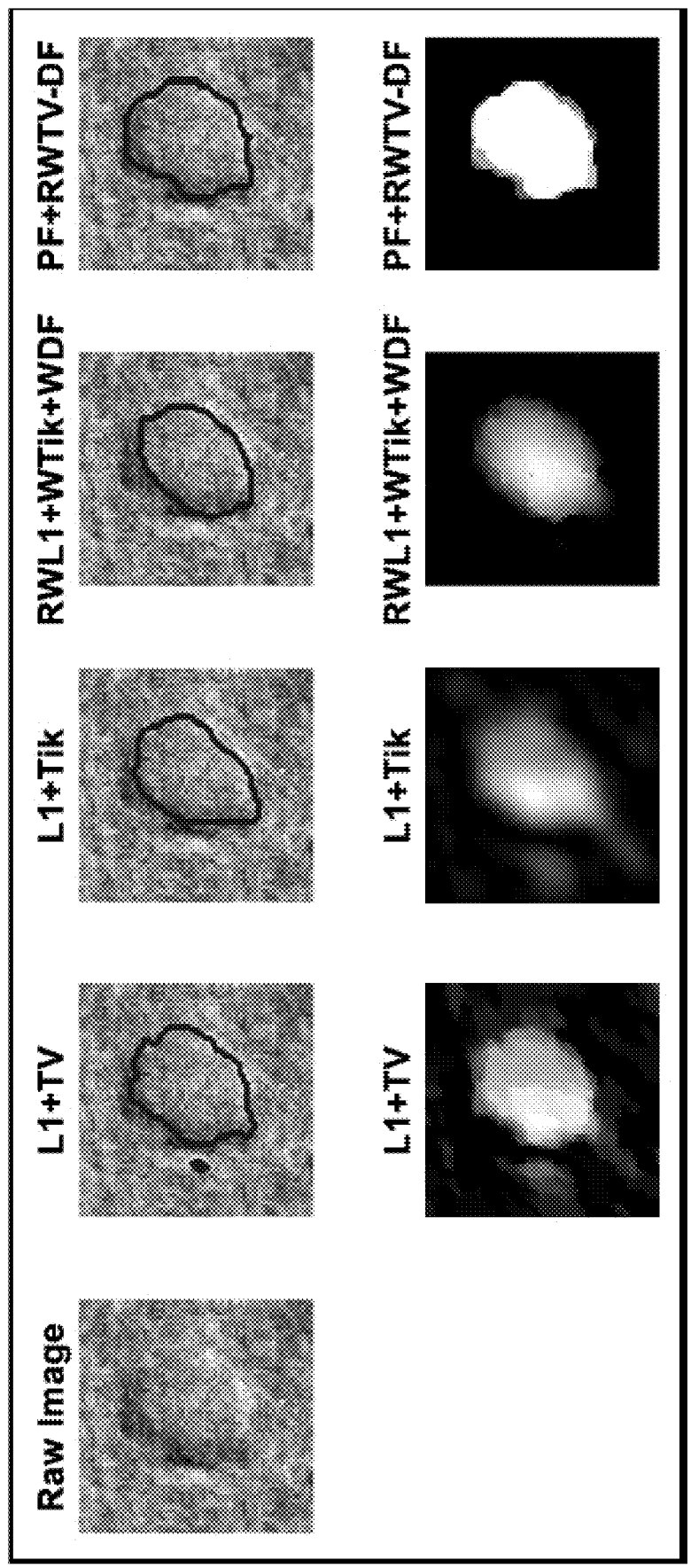
FIGS. 13A-13C show three example image patches of real cell data were deconvolved using four algorithms and the resulting segmentations (top row of FIGS. 13A, 13B and 13C) and deconvolutions (bottom row of FIGS. 13A, 13B and 13C) are displayed. Segmentations were obtained from deconvolution by global thresholding. The proposed PF+RWTV-DF algorithm performs consistently well even in severe interference (defined by the degree of distortion around the edges and surface undulations within the cell).
Figure 13B:
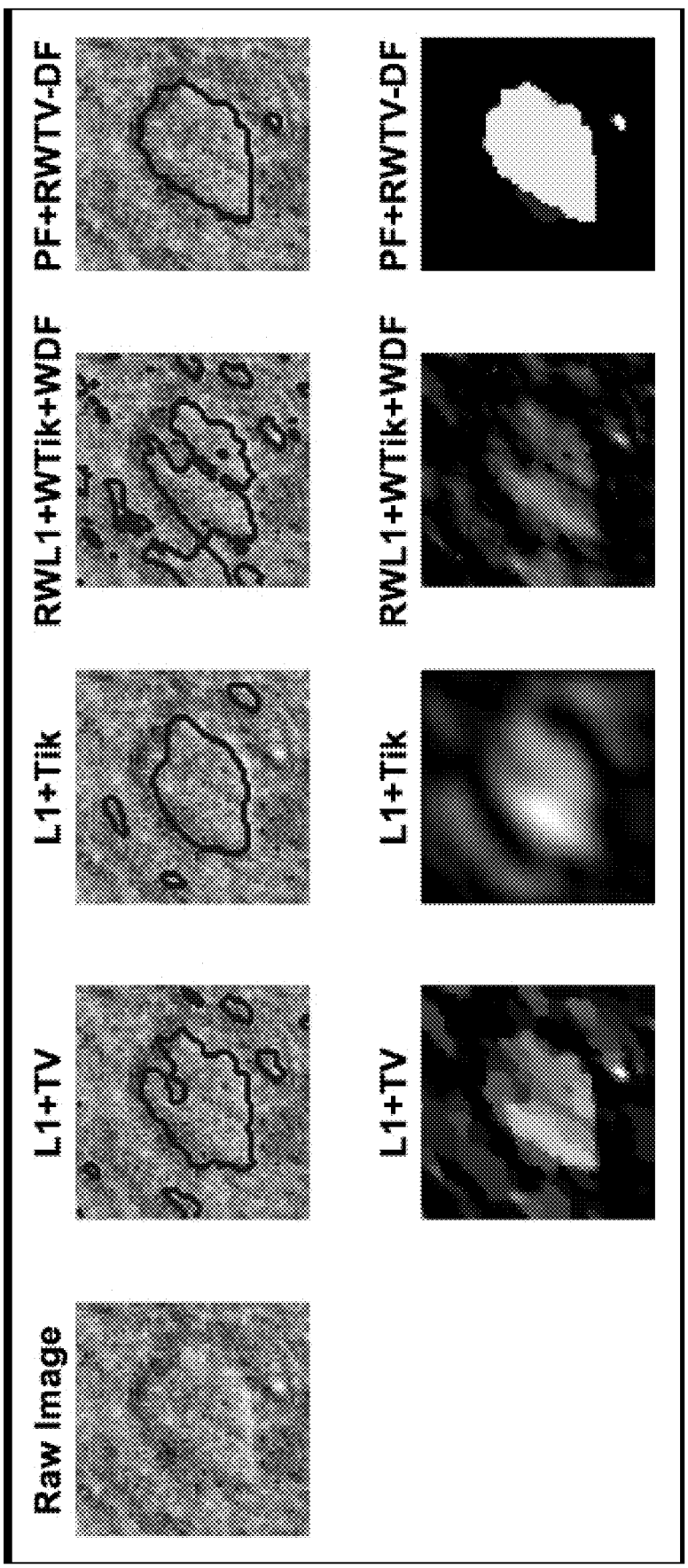
Figure 13C:
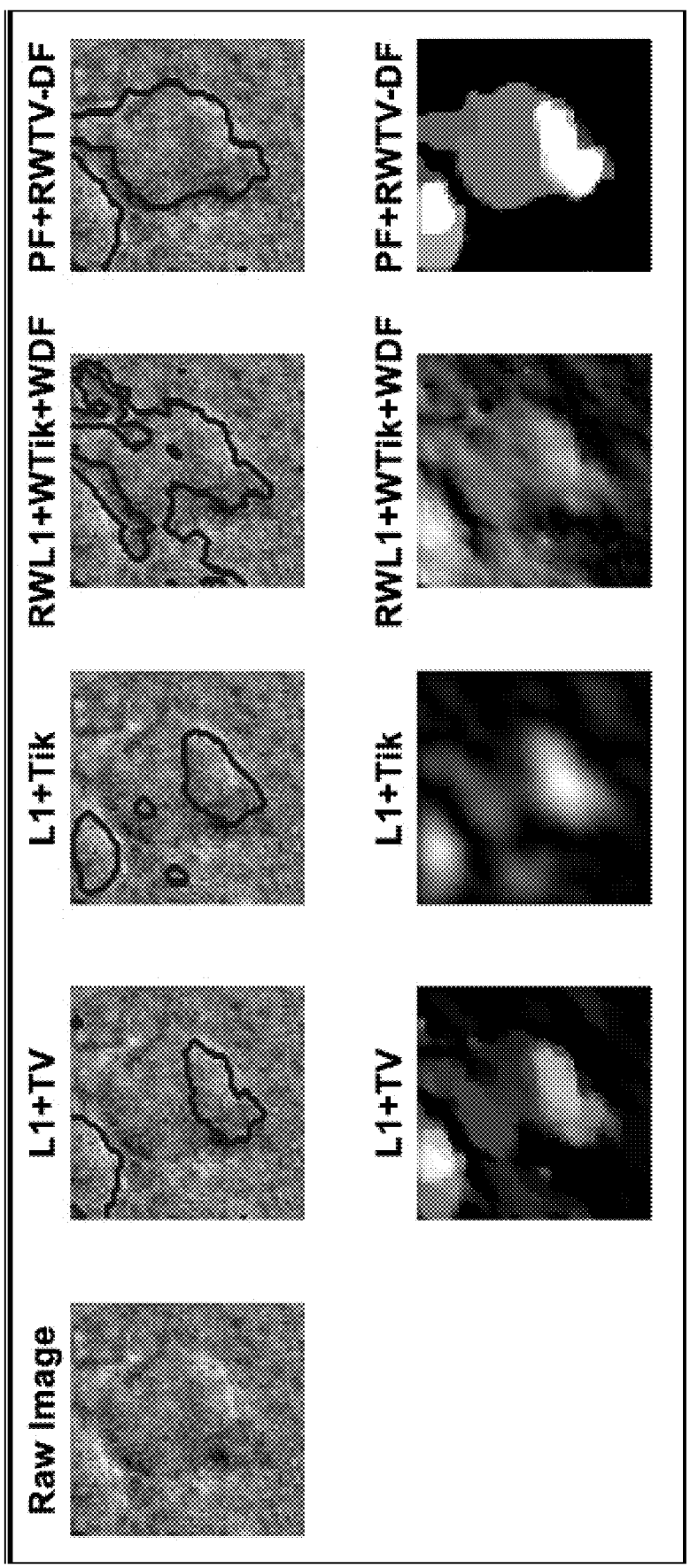

In FIGS. 13A-13C, three particularly challenging cell samples were selected with respect to the amount of observable interference around and within the cell. A fixed global threshold was applied to each patch for segmentation. The first example (FIG. 13A, from the top) demonstrated that reconstructions of other algorithms (compared to the proposed algorithm) were characteristically not piecewise smooth. Therefore, even in a case of moderate difficulty such as this one, these algorithms produce images with rounded edges which are not ideal for segmentation. The second example (FIG. 13B) illustrated difficulty in segmenting cells with significant interference along the cell's edges, around the outside of the cell, and within the body of the cell. In this case, only the proposed algorithm is able to produce a clean segmentation, especially along the cell's edges. Moreover, other algorithms reproduce the heavy interference scattered around the outside of the cell and this requires subsequent image processing to remove. The third example (FIG. 13C) was a very difficult case where interference occurs not only as distorted boundaries, but also as a close neighboring cell. All other algorithms visibly performed poorly while the proposed algorithm remained fairly consistent in its performance.

Figure 14A:
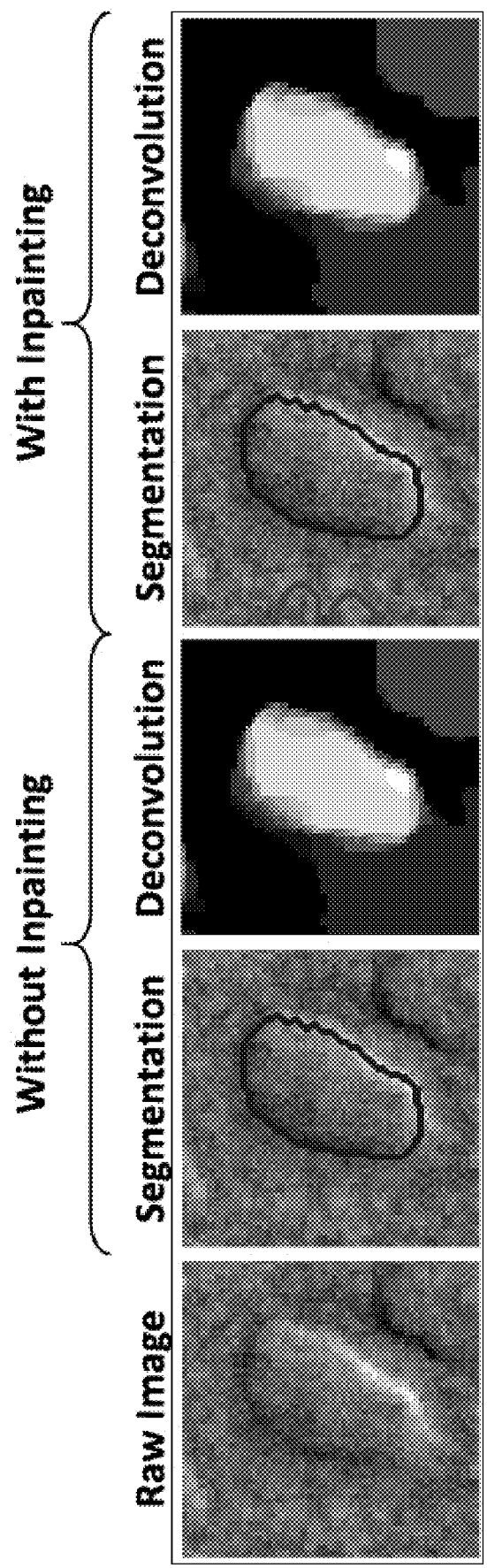
FIGS. 14A-14C depict snapshots from real video data of a cell undergoing patch clamping that demonstrated the efficacy of the proposed pipette removal method (via inpainting). The pipette mask is outlined in red while the cell segmentation is outlined in blue. Each snapshot illustrated varying degrees of overlap between the pipette and the cell.
Figure 14B:
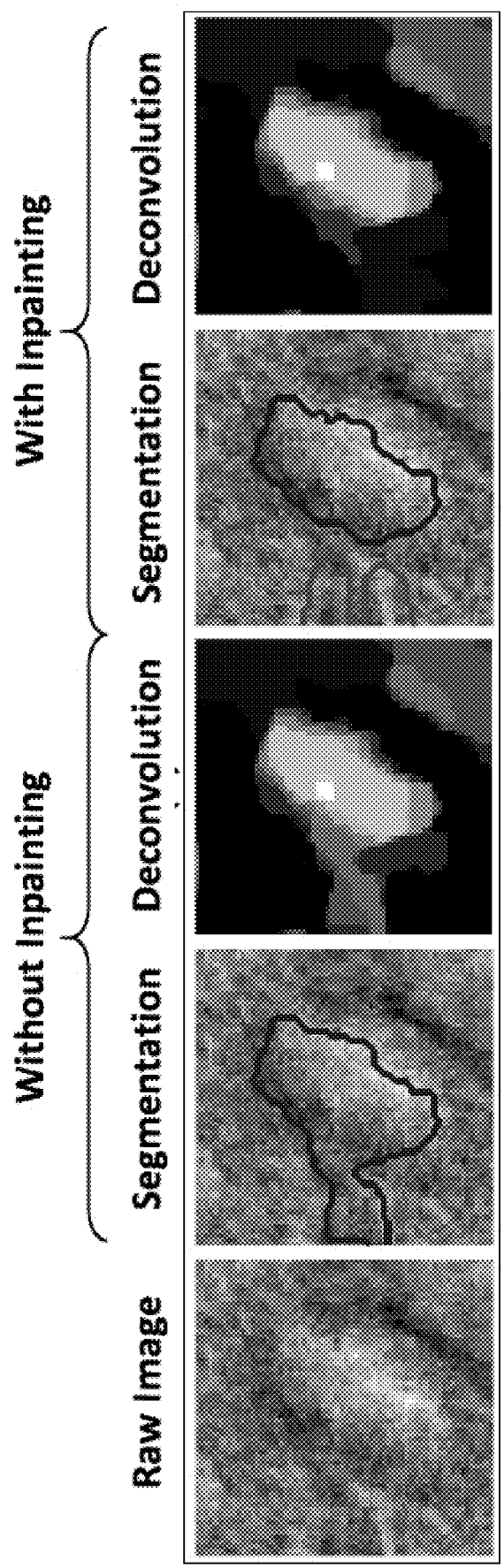
Figure 14C:
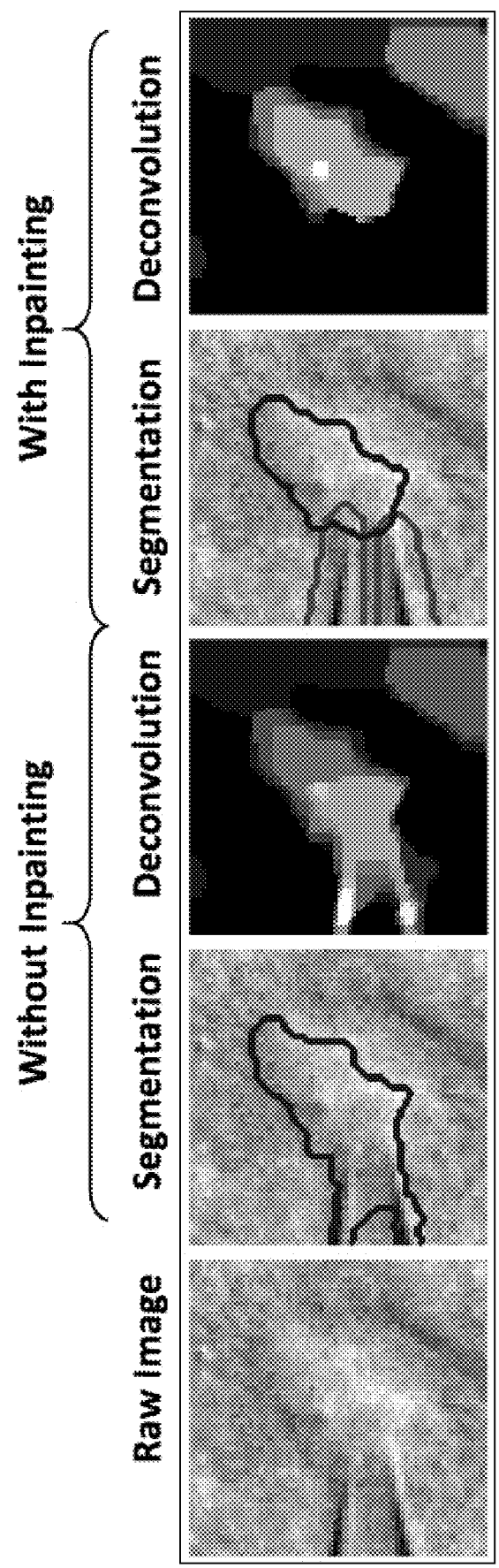

In FIG. 14, snapshots from a video of a cell undergoing patch clamping was compared with and without the proposed pipette removal method. The pipette (and its respective mask) was tracked using a template matching algorithm via a user-selected template of the pipette. In FIG. 14A, the pipette did not cause interference when it was relatively far away from the cell. As the pipette approached the cell in FIG. 14B, interference began to enter the deconvolution when inpainting was not applied. Without inpainting, an obfuscation between the pipette and the cell was observed in the deconvolution even when the pipette was not overlapping with the cell. In FIG. 14C, the pipette was seen to be overlapping the cell image. Without inpainting, this overlap caused such severe interference that attempting a pipette removal at the segmentation stage is clearly non-trivial. With inpainting, the deconvolution was shown to effectively suppress the interfering pipette in all three snapshots.

Conclusion

Herein is described a new deconvolution algorithm to locate cell boundaries with high precision in DIC microscopy images of brain slices. In summary, some of the technical contributions of this algorithm are: (1) a PE step that is a computationally cheap and effective way of removing heavy organic interference with spectral characteristics, (2) a dynamical ι1 reweighing approach for the propagation of second-order edge statistics in online DIC cell segmentation, and (3) an inpainting approach for pipette removal that is possible with little modification due to the inherently flexible framework of the algorithm. To quantitatively validate the performance of segmentation algorithms, this Example also describes the novel adaptation of cell simulation techniques to the specific data statistics of DIC microscopy imagery of brain slices in a publicly available MATLAB toolbox.

The proposed algorithm achieves state-of-the-art performance in tracking the boundary locations of cells, with the average and MBEs achieving the desired tolerances (i.e., 1-2 m) driven by the accuracy of actuators used for automatic pipette movement. These results led to the conclusion that accurate visual guidance can be possible for automated patch clamp systems, resulting in a significant step toward high-throughput brain slice electrophysiology. A possible shortfall of the proposed algorithm arises from the implicit assumption that dynamics are spatially limited. In order for dynamics to positively contribute to the deconvolution process, edges in the current frame should fall within the vicinity of the previous frame's edges; specifically, it should be bounded by the support of the prediction kernel as described by Equation 10. Improvements to the inventive method could include developing a real-time numerical implementation of this algorithm using parallelization methods such as alternating direction methods of multipliers (ADMM), exploring the inclusion of shape-regularizers into the optimization, investigating alternative methods that incorporate dynamics in a fashion that is not spatially-limiting, and characterizing dynamical functions that take into account physical models of motion in the system (e.g., motion induced by the pipette, fluid dynamics, cell deformation physics).

Simulation Framework

Simulation Stage 1: Cell Shape Generation

The cell-shape is unique to different applications and can play a significant role in algorithm development, necessitating customization in cell simulations. Extensive work on generic shape representation demonstrated that applying principal components analysis (PCA) on cell-shape outlines can be an excellent strategy for reconstructing cell shapes. Herein, an approach to generate synthetic cell-shapes using PCA and multivariate kernel density estimation sampling on subsampled cell contours was applied. For shape examples, hand drawn masks of neurons from DIC microscopy images of rodent brain slices were used.

Example cell-shapes were collected such that K coordinates were obtained in clockwise continuous fashion (around the contour), beginning at the north-most point. These points were centered such that the centroid is at the origin. The (x, y) coordinates were concatenated into an $\mathbb{R}^d$ vector $$x_i = (x_1, \ldots, x_K, y_1, \ldots, y_K)^T \quad (13)$$

where d=2K. This vector was then normalized via $\hat{x}_i = x_i / \|x_i\|_2$. All N normalized examples were gathered into the following matrix $X = (\hat{x}_1, \ldots, \hat{x}_N)$.

Eigen-decomposition was performed on the data covariance matrix formed as $S = XX^T = V \Lambda Y^T$. Cell-shapes may thus be expressed with the coefficient vector $b_i$ and the relationship given by $$x_i V b_i \Leftrightarrow b_i = V^T x_i \quad (14)$$

Figure 15A:
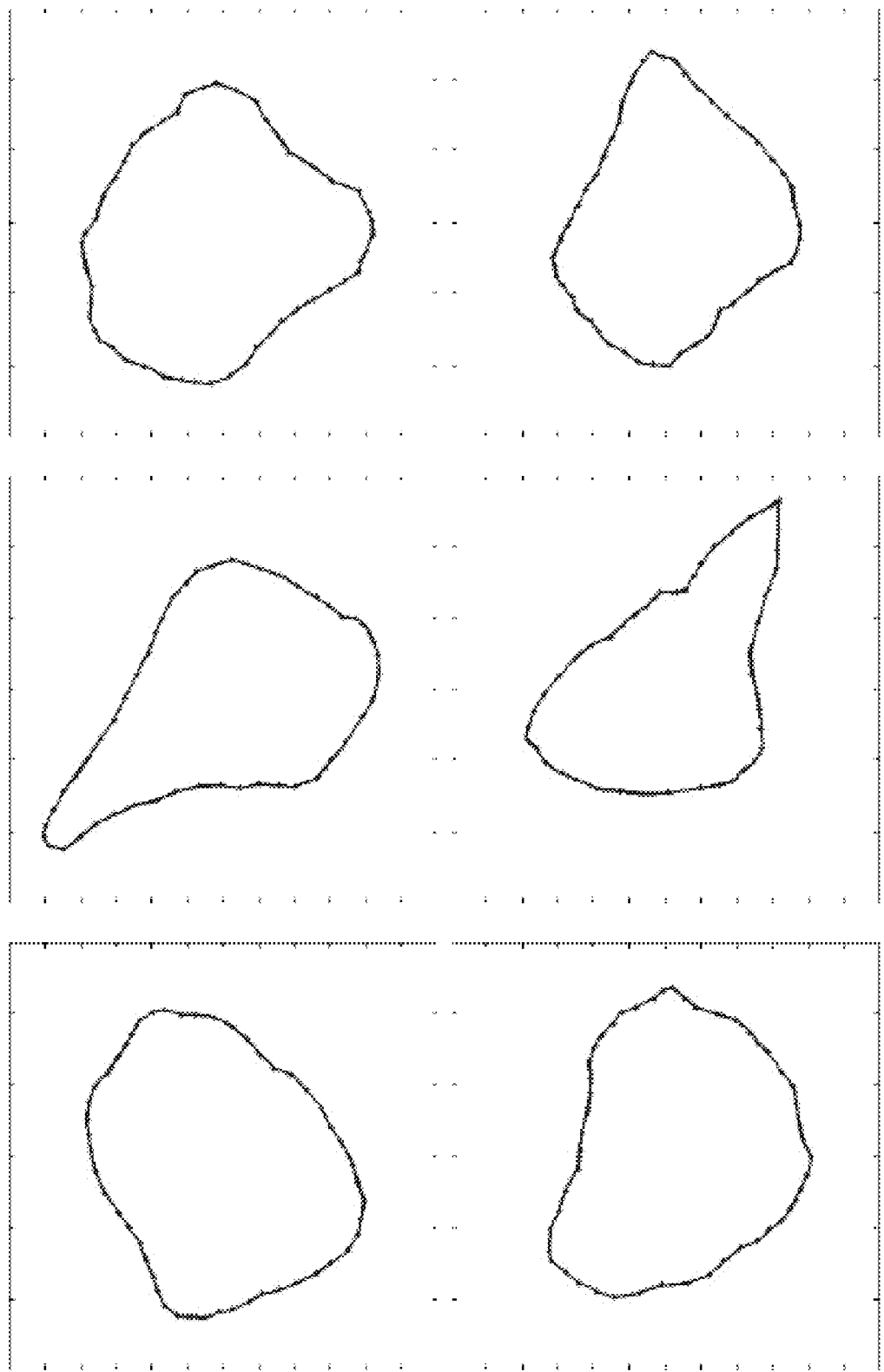
FIGS. 15A-15B show the visual similarities that were observed between the (FIG. 15A) synthetically generated cell-shapes, and the (FIG. 15B) cell-shapes extracted from DIC imagery of rodent brain slices.
Figure 15B:
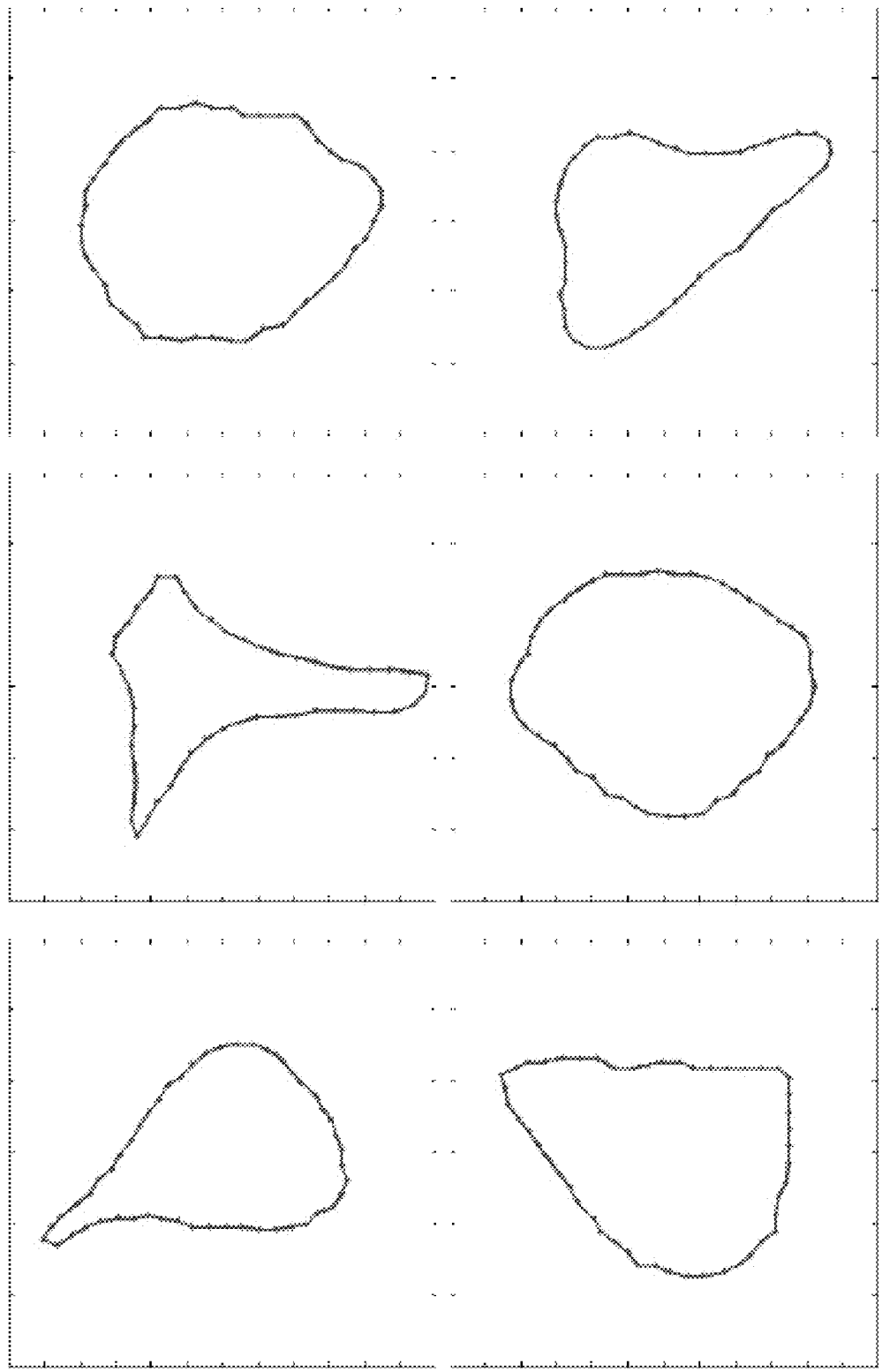

Since PCA guarantees that $\text{cov}(b_i, b_j) = 0$, $\forall_{i \neq j}$, kernel density estimation was performed individually on each of the coefficients to estimate its underlying distributions. This allows users to randomly sample from these distributions to produce a synthetically generated coefficient vector, $\tilde{b}$. The cell-shape may then be trivially converted into coordinates using the relationship given in Equation 14. A rotation ($\theta_{rot}$) and scaling ($\gamma_{scale}$) are added to the cell-shapes where necessary. FIGS. 15A-15B show a sampling of synthetic and actual cell-shapes extracted from the data.

1) Textured OPL Pixel-Space Embedding: The previously generated cell-shape was embedded into the pixel space $f_{x,y}$ by a texture generation method similar to methods found in other fluorescence microscopy simulators. In this stage, the cell-shape was embedded into the pixel space with the generation of a textured OPL image. Perlin noise is a well-established method for generating synthetic cell textures in fluorescent microscopy, and a similar concept was applied because it generated realistic looking cell textures.

First, a binary mask, m(x, y), was generated using the cell-shape's coordinates as polygon vertices and cast into an M×M image. Next, a textured image, t(x, y) was generated by frequency synthesis; a 2D filter with a $1/f^p$ frequency spectra was applied to white Gaussian noise, where p is a persistence term which controls the texture's heterogeneity. t(x, y) is rescaled such that $\hat{t}(x,y) \in [0,1]$. Finally, the OPL image is constructed by $$f(x,y) = (m(x,y) * h(x\ y)) \cdot (m(x,y) \cdot \hat{t}(x,y)) \quad (15)$$

where * signifies 2D convolution, and h(x, y) is a 2D filter (e.g., a circular pillbox averaging filter) that rounds the edges of the OPL image. An example surface texture is simulated and shown in FIG. 7B.

Simulation Stage 2: Optical Imaging

Microscopy optics was modeled here using two linear components: an effective point spread function (EPSF) and a lighting bias. DIC microscopy exploits the phase differential of the specimen to derive the edge representations of microscopy objects. The EPSF is approximated as a convolution of the OPL image f (x, y) against the steerable first-derivative of Gaussian kernel, in Equation 1.

Nonuniform lighting of a microscope often causes a pronounced lighting bias in the image. A linear approximation of quadratic coefficients sufficiently expresses such a bias:

$$b(x,y) = p_0 + p_1 x + p_2 y + p_3 x^2 + p_4 xy + p_5 y^2 \quad (16)$$

An example noiseless simulated image with the optical imaging model (including EPSF convolution and lighting bias) is shown in FIG. 7C. Polynomials $p_0, \ldots, p_5$ are estimated from a randomly extracted patch from an actual DIC image using a least-squares framework.

Simulation Stage 3: Noise Generation

1) Synthetic Noise Generation Framework: Noise in a video frame may be linearly decomposed into organic and sensor components:

$$n_k(x,y) = n^{organic}(x,y) + n_k^{sensor}(x,y) \quad (17)$$

with k denoting the frame index in time. Define $n^{organic}(x, y)$ as the components comprising of organic contributions in the specimen (e.g., cellular matter, fluids) that remain static frame-to-frame, while $n_k^{sensor}(x, y)$ (refers to noise from the CCD that is iid across every pixel and frame. For the purpose of statistical estimation, sequences of image frames $\{y_k(x, y)\}_{k=1,\ldots,K}$ that represented noise only (i.e., no target cell) with no tissue motion from pipette insertion were selected. The organic noise component was estimated by averaging a series of image frames (to reduce sensor noise):

$$n^{organic}(x, y) \approx \bar{y}(x, y) = \frac{1}{K} \sum_{k=1}^{K} y_k(x, y). \quad (18)$$

Similarly, a sensor noise sample may be estimated by subtracting the frame-average from the individual frame:

$$n_k^{sensor}(x,y) \approx y_k(x,y) - \bar{y}(x,y) \quad (19)$$

Figure 16A:
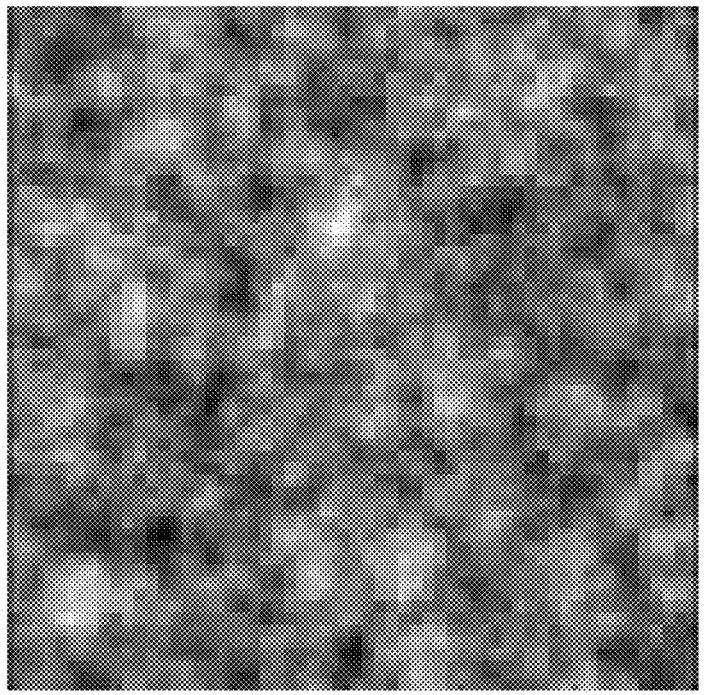
FIGS. 16A-16D show (FIG. 16A) synthetically generated organic noise (synthetic) (FIG. 16B) An image patch of organic noise from a real DIC image (i.e. an image patch with no cell, only noise) (FIG. 16C) Comparisons of pixel intensity distributions (FIG. 16D) Comparisons of the RAPSD.
Figure 16B:
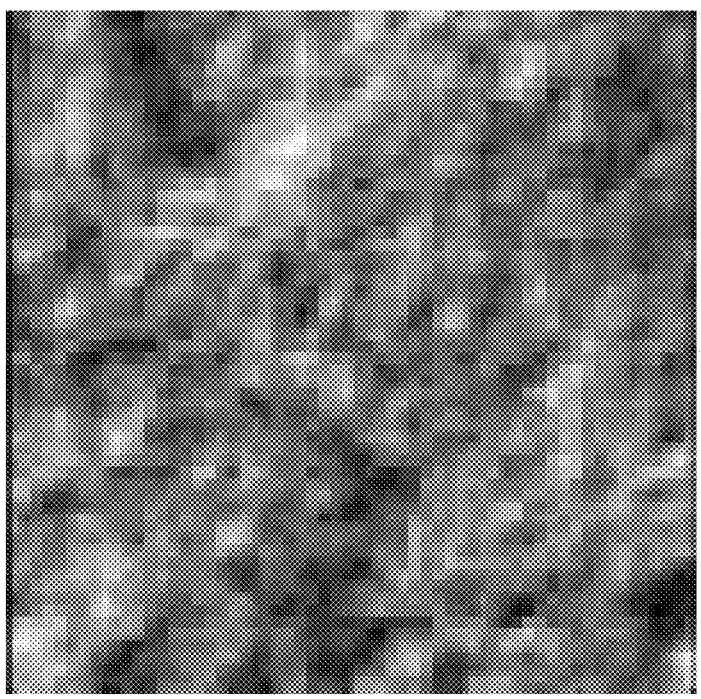

2) Organic Noise: A spectral analysis framework was employed to model and generate realistic looking interference caused by organic tissue. The RAPSD, P(f), was defined as an averaging of the power spectral density (PSD) magnitudes along a concentric ring (whose radius is proportional to frequency, denoted by (f) on a DC-centered spatial PSD Fourier plot. The RAPSD of random noise images reveal spectral characteristics shown in FIG. 16D. Phase information is simulated by randomly sampling from a uniform distribution $\Phi(m, n) \sim \text{Uniform}([0, 2\pi])$, with m, n representing the spatial coordinates in the DC-centered Fourier domain, while the magnitude information is composed as a mean spectra P(f) from the RAPSD of example image patches $\{P_k\}_{k=1,\ldots,K}$ as $$\bar{P}(f) = \frac{\sqrt{2}}{K} \sum_{k=1}^{K} P_k(f). \quad (20)$$

The organic noise spectrum is thus described by its magnitude and phase components as $$\tilde{S}(m,n) = \|\bar{P}(\sqrt{m^2+n^2})\| \exp(j \cdot \Phi(m,n)). \quad (21)$$

An inverse spatial Fourier transform on the organic noise spectrum yields a synthetic organic noise image:

$$\tilde{n}^{organic}(x,y) = \mathcal{F}^{-1}\{\tilde{S}(m,n)\}. \quad (22)$$

Figure 16C:
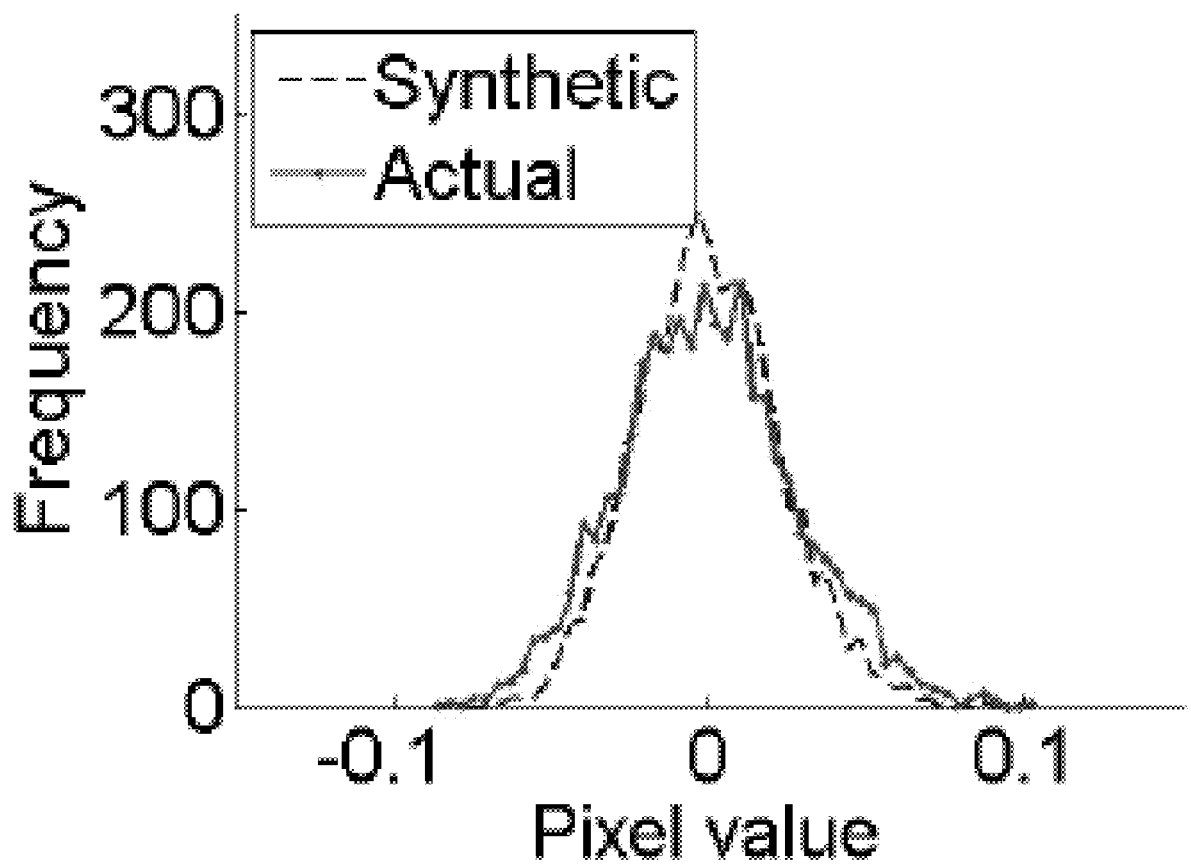
Figure 16D:
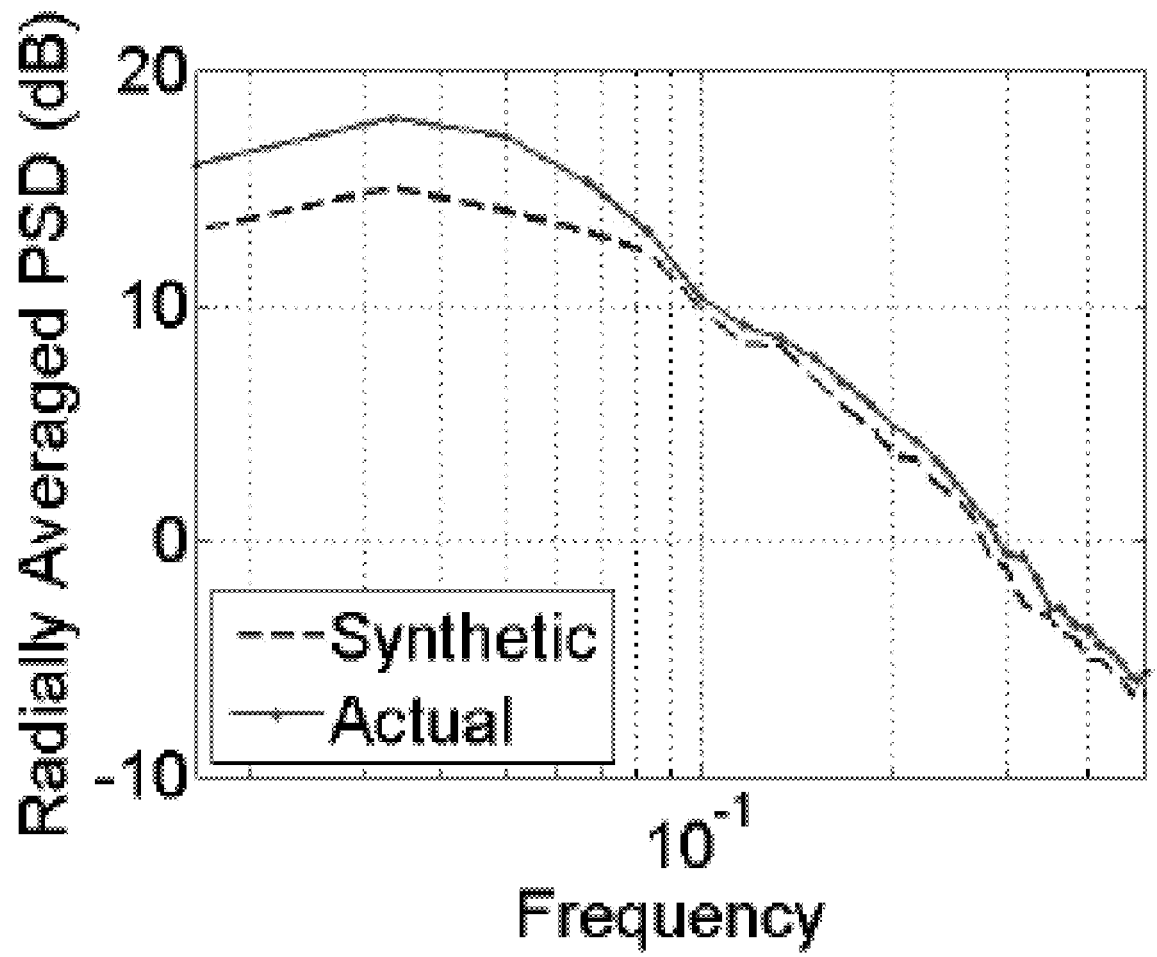

An example organic noise image patch $\tilde{n}^{organic}(x, y)$. (shown in FIG. 16A) exhibits visual similarities with a patch of organic noise from an actual DIC image (shown in FIG. 16B). Additionally, similarities were observed in pixel distributions between synthetic organic noise and actual organic noise, qualitatively as shown in FIG. 16C, as well as quantitatively via a Kolmogorov-Smirnov two-sample goodness-of-fit test at the 5% significance level (after normalization by their respective sample standard-deviations).

3) Sensor Noise: The CCD sensor contributes a mixture of Poisson noise and zero-mean white-Gaussian noise. For modeling simplicity, it was assumed that the sensor's individual pixels are uncorrelated in time and space, and generated using $$n_k^{sensor}(x,y) = A_g \cdot n_g + A_p \cdot n_p \qquad (23)$$

where $n_g \sim \text{Normal}(0, \sigma_g^2)$ and $n_p \sim \text{Poisson}(\Delta_p)$ are randomly generated intensity values, $\{A_g, A_p\}$ are amplitude parameters, and $\{\sigma_g, \lambda_p\}$ are the Gaussian's standard deviation and the Poisson's mean parameters respectively.

Image and Video Synthesis

1) Image Synthesis: Each simulation frame is generated as a linear combination of the various synthesized components $$y(x, y) = \left[ 10^{\chi/10} \frac{\|n(x, y)\|_F}{\|g(x, y)\|_F} \right] \cdot g(x, y) + n(x, y) + b(x, y) \qquad (24)$$

where $\chi$ is a user-defined SNR (in dB), and where $\|\cdot\|F$ is the Frobenius norm. Table I summarizes the user-defined parameters of this simulator.

Figure 17:
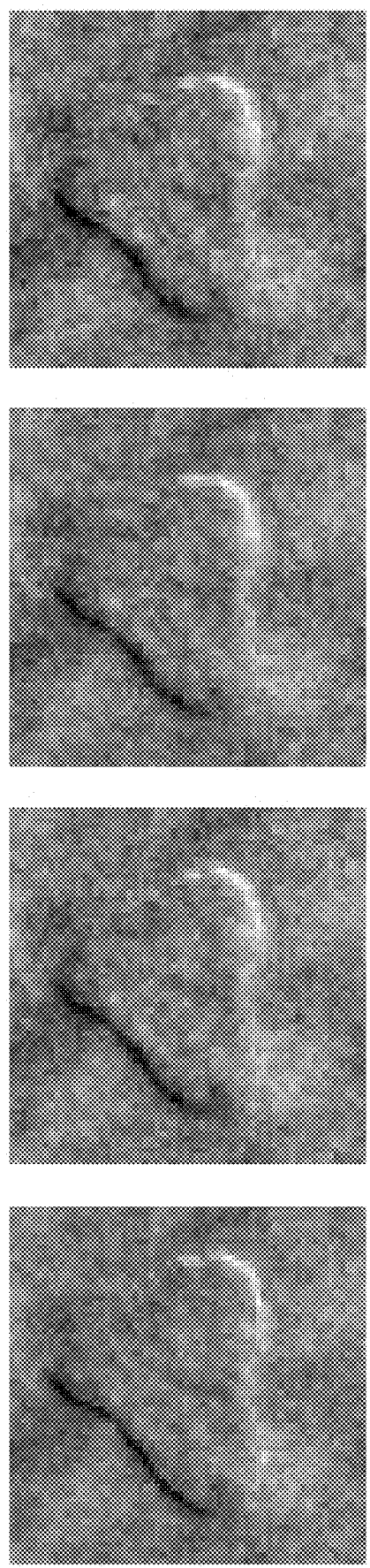
FIG. 17 shows four snapshots in time (indexed by k) from a synthesized video (of 100 frames), generated from a single cell image. The cell's motion induced by external forces (i.e., pipette motion, though not explicitly present) is simulated by a slight contraction followed by expansion over time, while performing a linear translation, from left to right of the frame. Synthetic interference (simulating organic material) shows up as a high-intensity blob around the bottom left corner of the cell, interfering with the cell's edges.

2) Video Synthesis: During the patch clamp process, pipette motion causes the cells to undergo overall translation (e.g., moving from left to right with respect to the frame), and some sequence of dilation and contraction. Videos of K image frames are generated to simulate motion of the cell (rather than the pipette itself) by evolving a single textured OPL pixel-space embedding image over time using a series of geometric transformations. Specifically, we simulate a dilation/contraction using MATLAB's barrel transformation function and apply geometric translation along a random linear path through the center of the image with a parabolic velocity profile (e.g., an acceleration followed by a deceleration). These transformations produced a set of frames $\{f_k(x, y)\}_{k=1,2,\ldots}$ which are convolved in 2D using Equation 1 and synthesized using Equation 24 to generate a set of time-varying observations $\{y_k(x, y)\}_{k=1,2,\ldots}$ comparable to a video sequence of DIC imagery from a patch clamp experiment. Example snapshots from a synthetic video is shown in FIG. 17.

Example Environment and Computer Architecture

Figure 20:
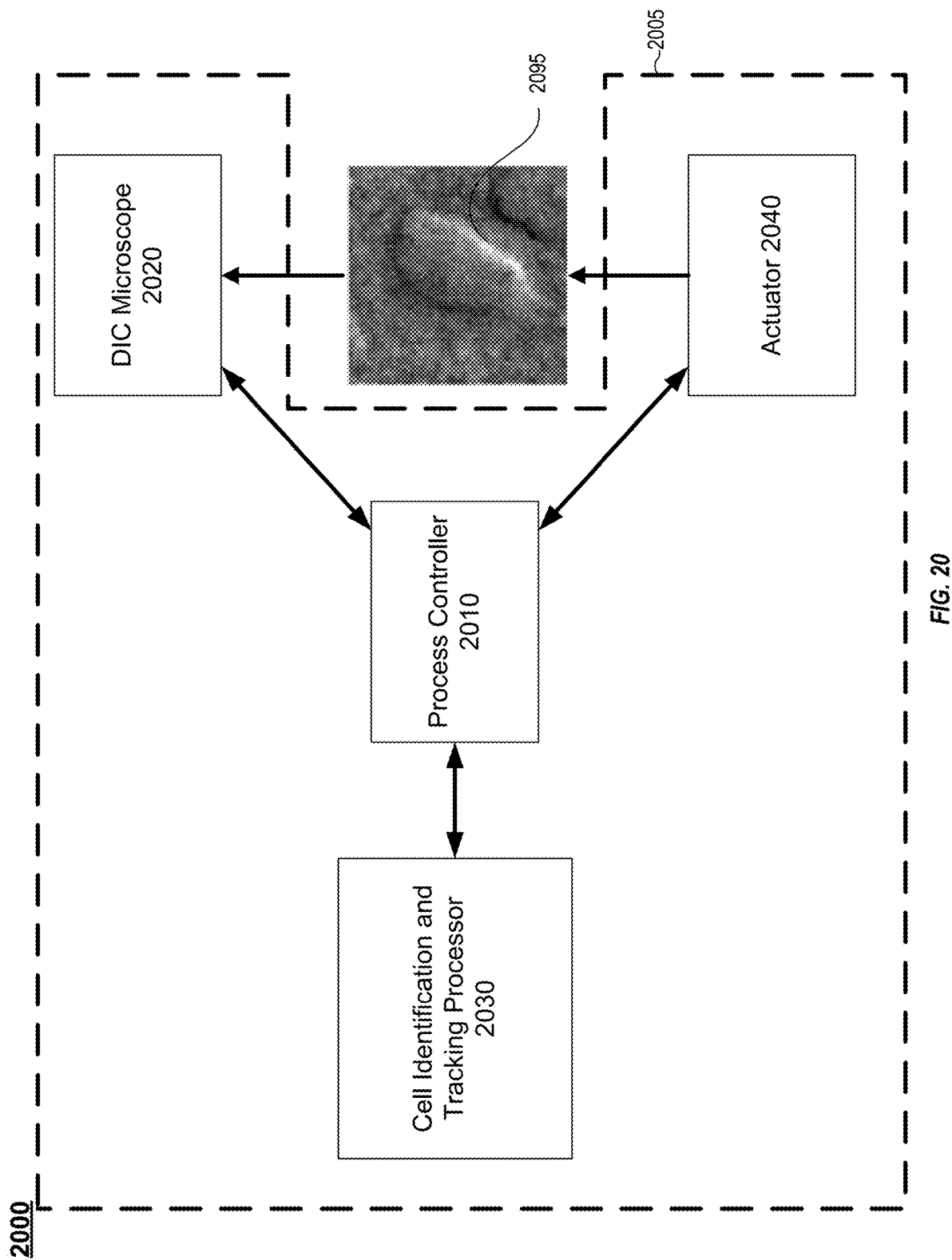
FIG. 20 illustrates an environment in which one or more aspects of the present disclosure may be implemented.

FIG. 20 illustrates an example environment 2000 in which certain aspects of the present disclosure may be implemented. The environment 2000 includes a process system 2005 and a tissue sample 2095. One of ordinary skill will recognize that this is merely an example environment, and aspects of the present disclosure may be applied outside of the presently discussed context. The process system 2005 may include a process controller 2010, a DIC microscope 2020, a cell identification and tracking processor 2030 (ID processor 2030), and an actuator 2040. An example computer architecture that may implement one or more aspects of the process controller 2010, DIC microscope 2020, cell identification and tracking processor 2030, and actuator 2040 are described below with reference to FIG. 21.

Process system 2005 is configured to perform a process on tissue sample 2095. For example, process system 2005 may be configured to perform automatic cell patch clamp electrophysiology on the tissue sample 2095 (e.g., brain tissue). However, one of ordinary skill will recognize that this is merely an example.

Process controller 2010 controls the behavior of the remaining components of process system 2005. DIC microscope 2020 may capture images of the tissue sample 2095 using DIC microscopy. One of ordinary skill will recognize that this is merely an example, and additional and/or alternative imaging techniques may be utilized. The DIC microscope 2020 may provide images of the tissue sample to the process controller 2010 (e.g., in real-time). The process controller 2010 provides the images to ID processor 2030.

ID processor 2030 may be configured to identify a boundary of a cell of the tissue sample within the images captured by DIC microscope 2020. As non-limiting examples, ID processor 2030 may perform patch tracking, deconvolution, and segmentation on the images to identify the cell boundary, for instance, as described above in greater detail. ID processor 2030 may provide the boundary information to the process controller 2010.

Process controller 2010 may then control actuator 2040 to move an instrument to coordinates corresponding to the cell boundary. In some cases, process controller 2010 may convert the image location information from ID processor 2030 to coordinates corresponding to the tissue sample.

Although process controller 2010, DIC microscope 2020, cell identification and tracking processor 2030, and actuator 2040 are depicted as separate, one of ordinary skill will recognize that various features and configurations of the process controller 2010, DIC microscope 2020, cell identification and tracking processor 2030, and actuator 2040 may be combined into one or more physical or logical devices.

Figure 21:
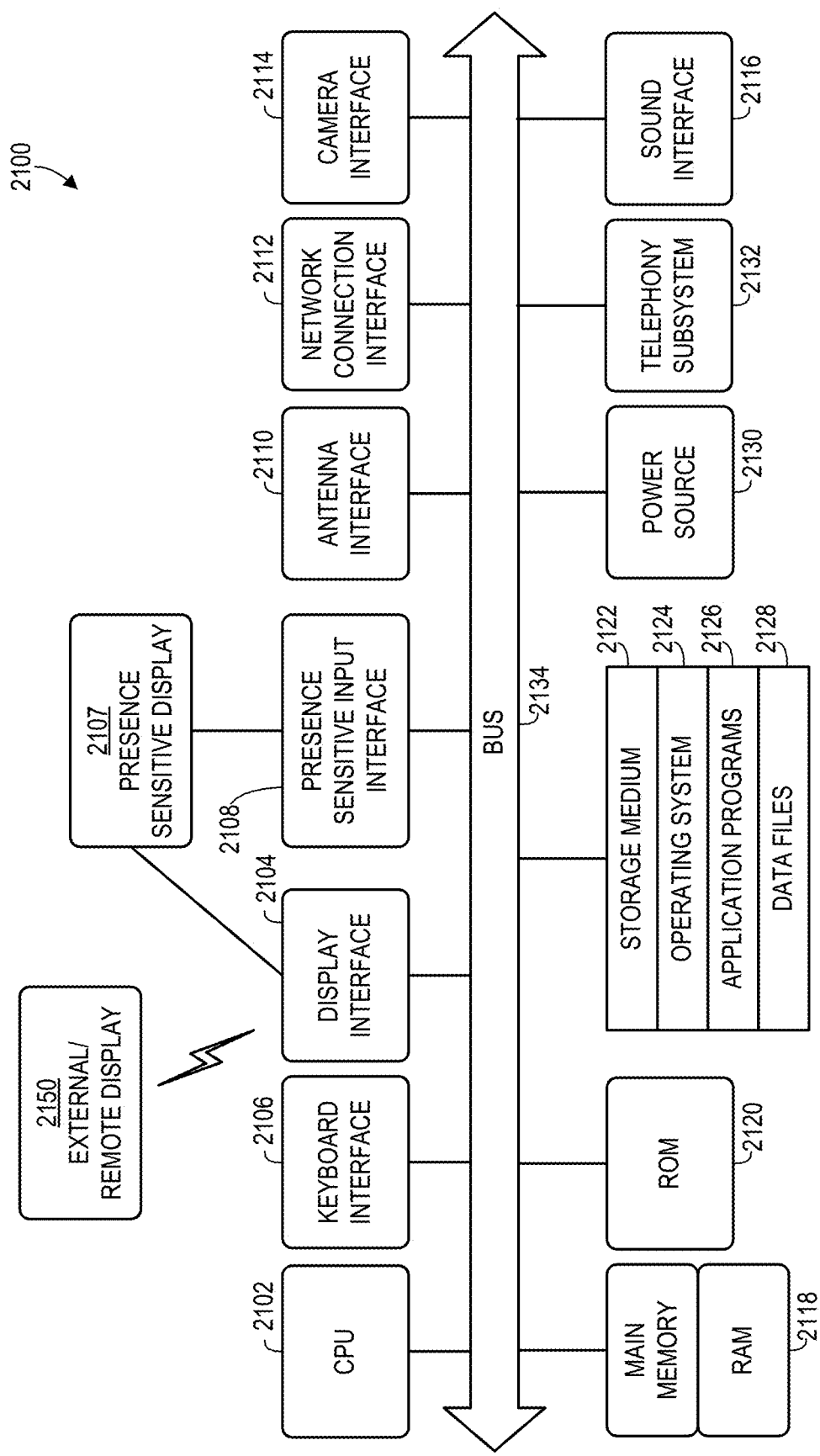
FIG. 21 is a block diagram of an example computer system capable of implementing certain aspects of the present disclosure.

FIG. 21 illustrates an example computing device architecture than can implement one or more aspects of the process system 2005, process controller 2010, DIC microscope 2020, cell identification and tracking processor 2030, and actuator 2040, and a method according to the present disclosure. In some embodiments, process controller 2010, DIC microscope 2020, cell identification and tracking processor 2030, and actuator 2040 may have fewer, alternative, or additional components as that illustrated in FIG. 21.

The computing device architecture 2100 of FIG. 21 includes a central processing unit (CPU) 2102, where computer instructions are processed, and a display interface 2104 that acts as a communication interface and provides functions for rendering video, graphics, images, and texts on the display. In certain example implementations of the disclosed technology, the display interface 2104 may be directly connected to a local display, such as a touch-screen display associated with a mobile computing device. In another example implementation, the display interface 2104 may be configured for providing data, images, and other information for an external/remote display 2150 that is not necessarily physically connected to the mobile computing device. For example, a desktop monitor may be used for mirroring graphics and other information that is presented on a mobile computing device. In certain example implementations, the display interface 2104 may wirelessly communicate, for example, via a Wi-Fi channel or other available network connection interface 2112 to the external/remote display 2150.

In an example implementation, the network connection interface 2112 may be configured as a communication interface and may provide functions for digital virtual assistant using voice, rendering video, graphics, images, text, other information, or any combination thereof on the display. In one example, a communication interface may include a microphone, camera, serial port, a parallel port, a general-purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 2104 may be operatively coupled to a local display, such as a touch-screen display associated with a mobile device or voice enabled device. In another example, the display interface 2104 may be configured to provide video, graphics, images, text, other information, or any combination thereof for an external/remote display 2150 that is not necessarily connected to the mobile computing device. In one example, a desktop monitor may be used for mirroring or extending graphical information that may be presented on a mobile device. In another example, the display interface 2104 may wirelessly communicate, for example, via the network connection interface 2112 such as a Wi-Fi transceiver to the external/remote display 2150.

The computing device architecture 2100 may include a keyboard interface 2106 that provides a communication interface to a keyboard. In one example implementation, the computing device architecture 2100 may include a presence sensitive input interface 2108 for connecting to a presence sensitive display 2107. According to certain example implementations of the disclosed technology, the presence sensitive input interface 2108 may provide a communication interface to various devices such as a pointing device, a touch screen, a depth camera, microphone, etc. which may or may not be associated with a display.

The computing device architecture 2100 may be configured to use an input device via one or more of input/output interfaces (for example, the keyboard interface 2106, the display interface 2104, the presence sensitive input interface 2108, network connection interface 2112, camera interface 2114, sound interface 2116, etc.) to allow a user to capture information into the computing device architecture 2100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 2100 or may be a separate device. For example, the input device may be an accelerometer, a magnetometer, a digital camera, a microphone, and an optical sensor.

Example implementations of the computing device architecture 2100 may include an antenna interface 2110 that provides a communication interface to an antenna; a network connection interface 2112 that provides a communication interface to a network. As mentioned above, the display interface 2104 may be in communication with the network connection interface 2112, for example, to provide information for display on a remote display that is not directly connected or attached to the system. In certain implementations, camera interface 2114 acts as a communication interface and provides functions for capturing digital images from a camera. In certain implementations, a sound interface 2116 is provided as a communication interface for converting sound into electrical signals using a microphone and for converting electrical signals into sound using a speaker. In certain implementations, a sound interface 2116 is utilized to capture voice inputs for consumption by of other components connected to the BUS 2134. According to example implementations, a random-access memory (RAM) 2118 is provided, where computer instructions and data may be stored in a volatile memory device for processing by the CPU 2102.

According to an example implementation, the computing device architecture 2100 includes a read-only memory (ROM) 2120 where invariant low-level system code or data for basic system functions such as basic input and output (I/O), startup, or reception of keystrokes from a keyboard are stored in a non-volatile memory device. According to an example implementation, the computing device architecture 2100 includes a storage medium 2122 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 2124, application programs 2126 (including, for example, a web browser application, a widget or gadget engine, and or other applications, as necessary) and data files 2128 are stored. According to an example implementation, the computing device architecture 2100 includes a power source 2130 that provides an appropriate alternating current (AC) or direct current (DC) to power components.

According to an example implementation, the computing device architecture 2100 includes a telephony subsystem 2132 that allows the computing device to transmit and receive sound over a telephone network. The constituent devices and the CPU 2102 communicate with each other over a bus 2134.

According to an example implementation, the CPU 2102 has appropriate structure to be a computer processor. In one arrangement, the CPU 2102 may include more than one processing unit. The RAM 2118 interfaces with the computer BUS 2134 to provide quick RAM storage to the CPU 2102 during the execution of software programs such as the operating system application programs, and device drivers. More specifically, the CPU 2102 loads computer-executable process steps from the storage medium 2122 or other media into a field of the RAM 2118 to execute software programs. Data may be stored in the RAM 2118, where the data may be accessed by the computer CPU 2102 during execution.

The storage medium 2122 itself may include a number of physical drive units, such as a redundant array of independent disks (RAID), a floppy disk drive, a flash memory, a USB flash drive, an external hard disk drive, thumb drive, pen drive, key drive, a high-density digital versatile disc (HD-DVD) optical disc drive, an internal hard disk drive, a Blu-Ray optical disc drive, or a holographic digital data storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 2122, which may include a machine-readable storage medium.

According to one example implementation, the term computing device, as used herein, may be a CPU, or conceptualized as a CPU (for example, the CPU 2102 of FIG. 21). In this example implementation, the CPU may be coupled, connected, and/or in communication with one or more peripheral devices, such as display. In another example implementation, the term computing device, as used herein, may refer to a mobile computing device such as a smart phone, tablet computer, or smart watch. In this example implementation, the computing device may output content to its local display and/or speaker(s). In another example implementation, the computing device may output content to an external display device (e.g., over Wi-Fi) such as a TV or an external computing system.

In example implementations of the disclosed technology, a computing device may include many hardware and/or software applications that are executed to facilitate the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be used to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with a number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network, a wired network, a wireless network, etc., for communication with external devices and/or systems.

While several possible embodiments are disclosed above, embodiments of the present disclosure are not so limited. These exemplary embodiments are not intended to be exhaustive or to unnecessarily limit the scope of the disclosure, but instead were chosen and described in order to explain the principles of the present disclosure so that others skilled in the art may practice the disclosure. Indeed, various modifications of the disclosure in addition to those described herein will become apparent to those skilled in the art from the foregoing description.

Such modifications are intended to fall within the scope of the appended claims.

Any patents, applications, publications, test methods, literature, and other materials cited herein are hereby incorporated by reference in their entirety as if physically present in this specification.

What is claimed is:

1. A system of determining a cell edge for detecting one or more characteristics of the cell comprising:
   memory configured to store data representative of a temporal sequence of images, the temporal sequence of images including at least:
      a current image containing at least a portion of a cell; and
      a previous image containing at least a portion of the cell imaged before the current image; and
   one or more processors coupled to the memory configured to:
      iteratively deconvolve the current image of the temporal sequence of images;
      wherein iteratively deconvolving the current image identifies an edge of the cell within the current image based on a determined edge of the cell identified in the previous image.

2. The system of claim 1 further comprising a detecting module that receives data representative of the identified edge of the cell within the current image and detects the characteristic of the cell.

3. The system of claim 2, wherein the characteristic of the cell is selected from the group consisting of an electrical activity, a molecular activity, a drug screening property, cell type, a biophysical property, a morphological property and a genetic property.

4. The system of claim 1 further comprising:
   an imaging device; and
   a detecting module;
   wherein the one or more processors are further configured to:
      receive the data representative of the temporal sequence of images; and
      segment the deconvolved current image to determine the edge of the cell within the current image; and
      wherein the detecting module receives data representative of the determined edge of the cell within the current image and detects the characteristic of the cell.

5. The system of claim 4, wherein the received image data representative of the current image of the temporal sequence of images further contains noise;
   wherein the one or more processors are further configured to filter at least a portion of the noise from the current image; and
   wherein iteratively deconvolving comprises iteratively deconvolving the filtered current image.

6. The system of claim 5, wherein the one or more processors are further configured to identify, within the filtered current image, a subset of the filtered current image containing at least a portion of the cell; and
   wherein iteratively deconvolving is only performed on the identified subset of the filtered current image.

7. The system of claim 5, wherein the temporal sequence of images include the filtered current image, the previous image, and a next image imaged after the filtered current image; and
   wherein the one or more processors are further configured to:
      set the filtered current image as the previous image;
      set the next image as the current image; and
      repeat the filtering, iteratively deconvolving, and segmenting.

8. The system of claim 7, wherein:
   the temporal sequence of images comprises a live video in real-time; and
   the edge of the cell within the filtered current image is determined in at least near real-time.

9. The system of claim 5, wherein the one or more processors are further configured to iteratively deconvolve the filtered current image by:
   determining an estimated edge that minimizes a cost function;
   adjusting one or more weights of the cost function based on the estimated edge; and
   repeating the determining and adjusting.

10. The system of claim 5, wherein the one or more processors are further configured to output positional data to an instrument proximal to the determined edge of the filtered current image.

11. The system of claim 5 further comprising an instrument;
   wherein the one or more processors are further configured to output positional data to the instrument.

12. The system of claim 5 further comprising an instrument selected from the group consisting of an electrode, an injector, and a manipulation instrument;

wherein the one or more processors are further configured to output positional data to the instrument proximal to the determined edge of the filtered current image.

13. The system of claim 9, wherein:
the cost function comprises:
a first term corresponding to a predictive error between the filtered current image and an image predicted from the estimated edge; and
a second term corresponding to a connectivity determination of the estimated edge within the filtered current image;
at least one adjusted weight of the cost function modifies the connectivity determination of the estimated edge within the filtered current image; and
the determined edge of the cell within the previous image impacts at least one adjusted weight.

14. A computer-implemented method of determining a cell edge for detecting one or more characteristics of the cell comprising:
iteratively deconvolving, by a system comprising one or more processors, a current image of a temporal sequence of images, the temporal sequence of images including at least:
the current image containing at least a portion of a cell; and
a previous image containing at least a portion of the cell imaged before the current image; and
identifying, by the system, an edge of the cell within the current image based on a determined edge of the cell identified in the previous image.

15. The method of claim 14 further comprising:
receiving, by the system, from an imaging device image data representative of the temporal sequence of images prior to iteratively deconvolving the current image, wherein the image data representative of the current image further contains noise;
filtering, by the system, at least a portion of the noise from the current image, wherein iteratively deconvolving comprises iteratively deconvolving the filtered current image; and
segmenting, by the system, the deconvolved filtered current image to determine the edge of the cell within the filtered current image.

16. The method of claim 15 further comprising iteratively deconvolving the filtered current image by:
determining, by the system, an estimated edge that minimizes a cost function;
adjusting, by the system, one or more weights of the cost function based on the estimated edge; and
repeating, by the system, the determining and adjusting.

17. The method of claim 15 further comprising deconvolving the filtered current image by:
iteratively, by the system, estimating an edge that minimizes a cost function utilizing alternating direction method of multipliers (ADMM);
adjusting, by the system, one or more weights of the cost function based on the estimated edge; and
repeating, by the system, the estimating and adjusting.

18. The method of claim 15 further comprising moving an instrument proximal to the determined edge of the cell.

19. A non-transitory computer-readable medium having stored thereon computer-readable instructions executable to cause a computer to perform a method of determining a cell edge for detecting one or more characteristics of the cell, the method comprising:
receiving from an imaging device image data representative of a temporal sequence of images including at least:
a current image containing noise and at least a portion of a cell; and
a previous image containing at least a portion of the cell imaged before the current image;
filtering at least a portion of the noise from the current image;
iteratively deconvolving the filtered current image to identify an edge of the cell within the filtered current image based on a determined edge of the cell within the previous image; and
segmenting the deconvolved filtered current image to determine the edge of the cell within the filtered current image.

20. The computer-readable medium of claim 19, wherein the method further comprises deconvolving the filtered current image by:
iteratively estimating an edge that minimizes a cost function utilizing alternating direction method of multipliers (ADMM);
adjusting one or more weights of the cost function based on the estimated edge; and
repeating the estimating and adjusting.

* * * * *